(12) United States Patent
Sun

(10) Patent No.: US 11,462,954 B2
(45) Date of Patent: Oct. 4, 2022

(54) METHOD AND APPARATUS FOR ADJUSTING COIL POSITION

(71) Applicant: BEIJING XIAOMI MOBILE SOFTWARE CO., LTD., Beijing (CN)

(72) Inventor: Changyu Sun, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 121 days.

(21) Appl. No.: 16/841,698

(22) Filed: Apr. 7, 2020

(65) Prior Publication Data

US 2020/0412181 A1 Dec. 31, 2020

(30) Foreign Application Priority Data

Jun. 28, 2019 (CN) .......................... 201910577689.7

(51) Int. Cl.
*H02J 50/90* (2016.01)
*H02J 50/80* (2016.01)
*H02J 50/10* (2016.01)
*H02J 50/70* (2016.01)
*H01F 27/36* (2006.01)
*H01F 38/14* (2006.01)
*H02J 7/02* (2016.01)

(52) U.S. Cl.
CPC .............. *H02J 50/90* (2016.02); *H01F 27/36* (2013.01); *H01F 38/14* (2013.01); *H02J 7/02* (2013.01); *H02J 50/10* (2016.02); *H02J 50/70* (2016.02); *H02J 50/80* (2016.02)

(58) Field of Classification Search
CPC .... H02J 50/90; H02J 7/02; H02J 50/10; H02J 50/70; H02J 50/80; H01F 27/36; H01F 38/14; Y02B 40/00
See application file for complete search history.

(56) References Cited

U.S. PATENT DOCUMENTS

| 9,379,571 | B2* | 6/2016 | Boyer | .................. B60L 53/122 |
| 2009/0079269 | A1 | 3/2009 | Jin | |
| 2012/0043931 | A1* | 2/2012 | Terao | ...................... H02J 50/90 320/108 |

(Continued)

FOREIGN PATENT DOCUMENTS

| CN | 102545326 A | 7/2012 |
| CN | 105539186 A | 5/2016 |

(Continued)

OTHER PUBLICATIONS

Extended European search report of counterpart EP application No. 20171824.4 dated Feb. 23, 2021.

(Continued)

*Primary Examiner* — Nghia M Doan
(74) *Attorney, Agent, or Firm* — Syncoda LLC; Feng Ma

(57) ABSTRACT

A method for adjusting a coil position includes: acquiring position offset indication information between a transmitting coil in a power transmitting device and a receiving coil in a power receiving device; wherein the power transmitting device is configured to wirelessly charge the power receiving device, and the position offset indication information is used to reflect a position offset between the transmitting coil and the receiving coil; and adjusting a position of the transmitting coil according to the position offset indication information.

19 Claims, 7 Drawing Sheets

(56) References Cited

U.S. PATENT DOCUMENTS

| | | | | |
|---|---|---|---|---|
| 2012/0212178 A1* | 8/2012 | Kim | ........................ | H02J 7/025 320/108 |
| 2014/0117926 A1 | 5/2014 | Hwu et al. | | |
| 2017/0338682 A1 | 11/2017 | Yuan et al. | | |
| 2018/0054086 A1 | 2/2018 | Jung | | |
| 2018/0290550 A1 | 10/2018 | Yang et al. | | |
| 2021/0218289 A1* | 7/2021 | Kyeong | .................. | H02J 50/80 |

FOREIGN PATENT DOCUMENTS

| | | | |
|---|---|---|---|
| CN | 106568376 A | 4/2017 | |
| CN | 108123556 A | 6/2018 | |
| CN | 108923547 A | 11/2018 | |
| CN | 108988499 A | 12/2018 | |
| JP | 2010183706 A | 8/2010 | |

OTHER PUBLICATIONS

Partial Extended European search report of counterpart EP application No. 20171824.4 dated Oct. 22, 2020.
First office action of Chinese application No. 201910577689.7 dated Dec. 14, 2021.
China National Intellectual Property Administration, Second office action of Chinese application No. 201910577689.7 dated Aug. 1, 2022, which is foreign counterpart application of this US application.
M.Loveridge, Temperature Considerations for Charging Li-Ion Batteries: Inductive versus Mains Charging Modes for Portable Electronic Devices, Apr. 17, 2019, pp. 1086-1091, ACS Energy Letters, vol. 4 Issue 5.

* cited by examiner

METHOD AND APPARATUS FOR ADJUSTING COIL POSITION

CROSS-REFERENCE TO RELATED APPLICATION

The present application claims priority to Chinese Patent Application No. 201910577689.7 filed on Jun. 28, 2019, the disclosure of which is hereby incorporated by reference in its entirety.

BACKGROUND

Wireless charging technology is a charging technology that uses the principle of electromagnetic induction, that is, electrical energy is transmitted by using an alternating magnetic field generated between coils.

SUMMARY

Embodiments of the present disclosure relate to the technical field of wireless charging, and in particular, relate to a method and apparatus for adjusting a coil position.

According to a first aspect of the present disclosure, a method for adjusting a coil position is provided, which is applied to a power transmitting device. The method includes:

acquiring position offset indication information between a transmitting coil in the power transmitting device and a receiving coil in a power receiving device; wherein the power transmitting device is configured to wirelessly charge the power receiving device, and the position offset indication information is used to reflect a position offset between the transmitting coil and the receiving coil; and adjusting a position of the transmitting coil according to the position offset indication information.

According to a second aspect of the present disclosure, a method for adjusting a coil position is provided, which is applied to a power receiving device. The method includes:

determining, by a magnetic induction sensor, a position of a transmitting coil in a power transmitting device configured to wirelessly charge the power receiving device;

determining a position adjustment parameter of the transmitting coil according to a position of a receiving coil in the power receiving device and the position of the transmitting coil, wherein the position adjustment parameter is used to indicate an adjustment direction and an adjustment distance of the transmitting coil; and transmitting the position adjustment parameter to the power transmitting device.

According to a third aspect of the present disclosure, an apparatus for adjusting a coil position is provided, which is applied to a power transmitting device. The apparatus includes:
a processor; and
a memory configured to store at least one instruction executable by the processor;
wherein the processor is configured to implement the method according to the first aspect of the present disclosure.

According to a fourth aspect of the present disclosure, an apparatus for adjusting a coil position is provided, which is applied to a power receiving device. The apparatus includes:
a processor; and
a memory configured to store at least one instruction executable by the processor;
wherein the processor is configured to implement the method according to the second aspect of the present disclosure.

It is to be understood that both the foregoing general description and the following detailed description are exemplary and explanatory only and are not used to limit the present disclosure.

BRIEF DESCRIPTION OF THE DRAWINGS

The accompanying drawings herein, which are incorporated into and constitute a part of the disclosure, illustrate embodiments consistent with the present disclosure, and together with the specification, serve to explain the principles of the present disclosure.

DETAILED DESCRIPTION

Exemplary embodiments will be described in detail herein, examples of which are illustrated in the accompanying drawings. The following description refers to the accompanying drawings in which the same numbers in different drawings represent the same or similar elements unless otherwise indicated. The implementations set forth in the following exemplary embodiments do not represent all implementations consistent with the present invention. Rather, they are merely examples of devices and methods consistent with certain aspects of the present invention as detailed in the appended claims.

Wireless charging can be applied to a mobile terminal such as a mobile phone. The mobile phone can be placed on a wireless charging device. The wireless charging device can be provided with a transmitting coil, and the mobile phone can be provided with a receiving coil. When the mobile phone is placed on the wireless charging device, the transmitting coil is powered on and generates a constantly varying magnetic field, and the receiving coil may sense variations of the magnetic field and generates a current which charges the battery of the mobile phone and implements wireless charging.

In a case that the mobile phone is placed at an improper position on the wireless charging device, a charging efficiency may not be ensured.

Figure 1:
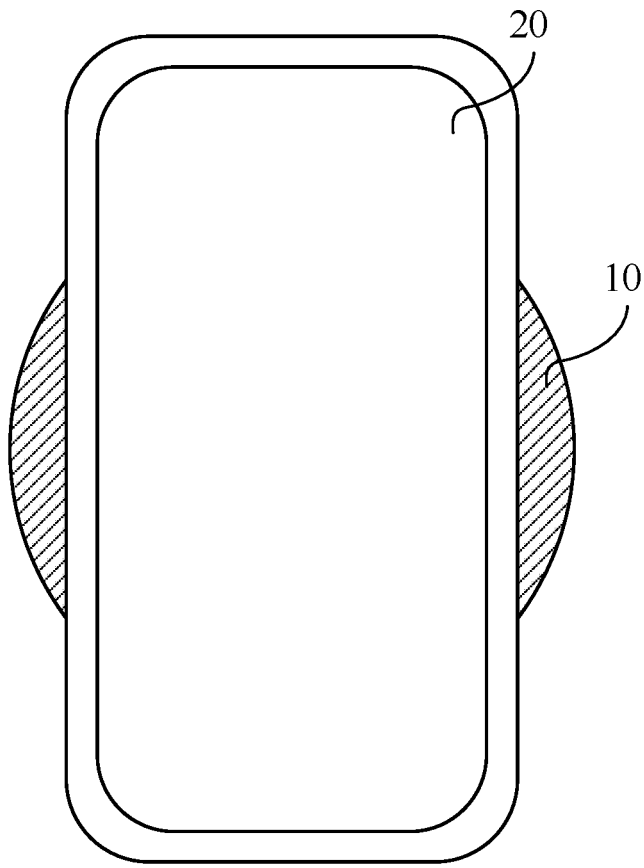
FIG. 1 is a schematic diagram of a service scenario of wireless charging according to some embodiments of the present disclosure.

FIG. 1 is a schematic diagram of a service scenario of wireless charging according to some embodiments of the present disclosure. The service scenario may include a power transmitting device 10 and a power receiving device 20.

The power transmitting device 10 refers to a device configured to supply power to a power consuming device in a wireless charging system. In different service scenarios, the power transmitting device 10 may be named differently. For example, if the power transmitting device 10 is configured to wirelessly charge a portable electronic device such as a mobile phone, a tablet computer, a wearable device or the like, the power transmitting device 10 may be referred to as a charger, a charger pad, a power adapter, a wireless charger or the like.

The power receiving device 20 refers to a device configured to receive power in wireless charging, that is, a power consuming device. The power receiving device 20 may be any power consuming device supporting wireless charging, for example, a terminal device such as a mobile phone, a tablet computer, a wearable device or the like, which is not limited in the embodiments of the present disclosure.

The technical solutions according to the embodiments of the present disclosure are applicable to a scenario of wireless charging for a terminal device such as a mobile phone, a tablet computer, or a wearable device.

Figure 2:
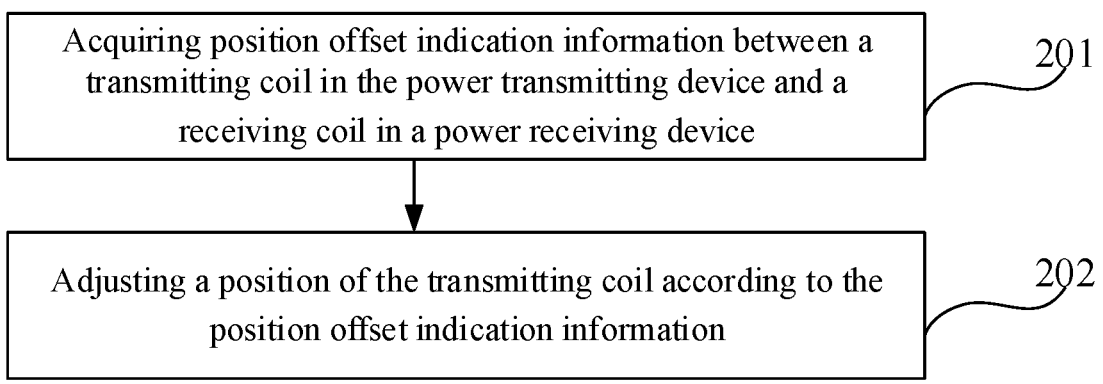
FIG. 2 is a flowchart of a method for adjusting a coil position according to some embodiments of the present disclosure.

FIG. 2 is a flowchart of a method for adjusting a coil position according to some embodiments of the present disclosure. The method can be applied to the power transmitting device 10 as described above. The method can include the following steps (steps 201 to 202).

Step 201: position offset indication information between a transmitting coil in the power transmitting device and a receiving coil in a power receiving device is acquired.

In the embodiment of the present disclosure, the power transmitting device is configured to wirelessly charge the power receiving device, and the position offset indication information is used to reflect a position offset between the transmitting coil and the receiving coil. For specific description about the position offset indication information, reference may be made to the embodiments hereinafter, which is not described herein any further.

Step 202: a position of the transmitting coil is adjusted according to the position offset indication information.

In the embodiment of the present disclosure, the power transmitting device is capable of adjusting the position of the transmitting coil, such that a geometric center of the transmitting coil coincides with or approaches that of the receiving coil as far as possible and thus improves the charging efficiency. In some embodiments, a power device may be arranged in the power transmitting device, and the power device is configured to control the transmitting coil to move, for example, control the transmitting coil to move within a plane where the transmitting coil is located.

In a possible design, the power device may be designed as follows. Electromagnets are arranged along X and Y directions of the transmitting coil in the power transmitting device, magnets or iron sheets or other magnetic material are arranged on the position of transmitting coil corresponding to the electromagnets for receiving forces generated by the electromagnets. By applying currents of different sizes to the electromagnets, forces of different sizes are generated between the electromagnets and the magnets. By applying the currents to different electromagnets, the transmitting coil may sense forces of different directions. By applying the currents of different sizes to the different electromagnets, a resultant force sensed by the transmitting coil is a position offset amount desired by the transmitting coil, such that the transmitting coil is aligned with the receiving coil.

Figure 3:
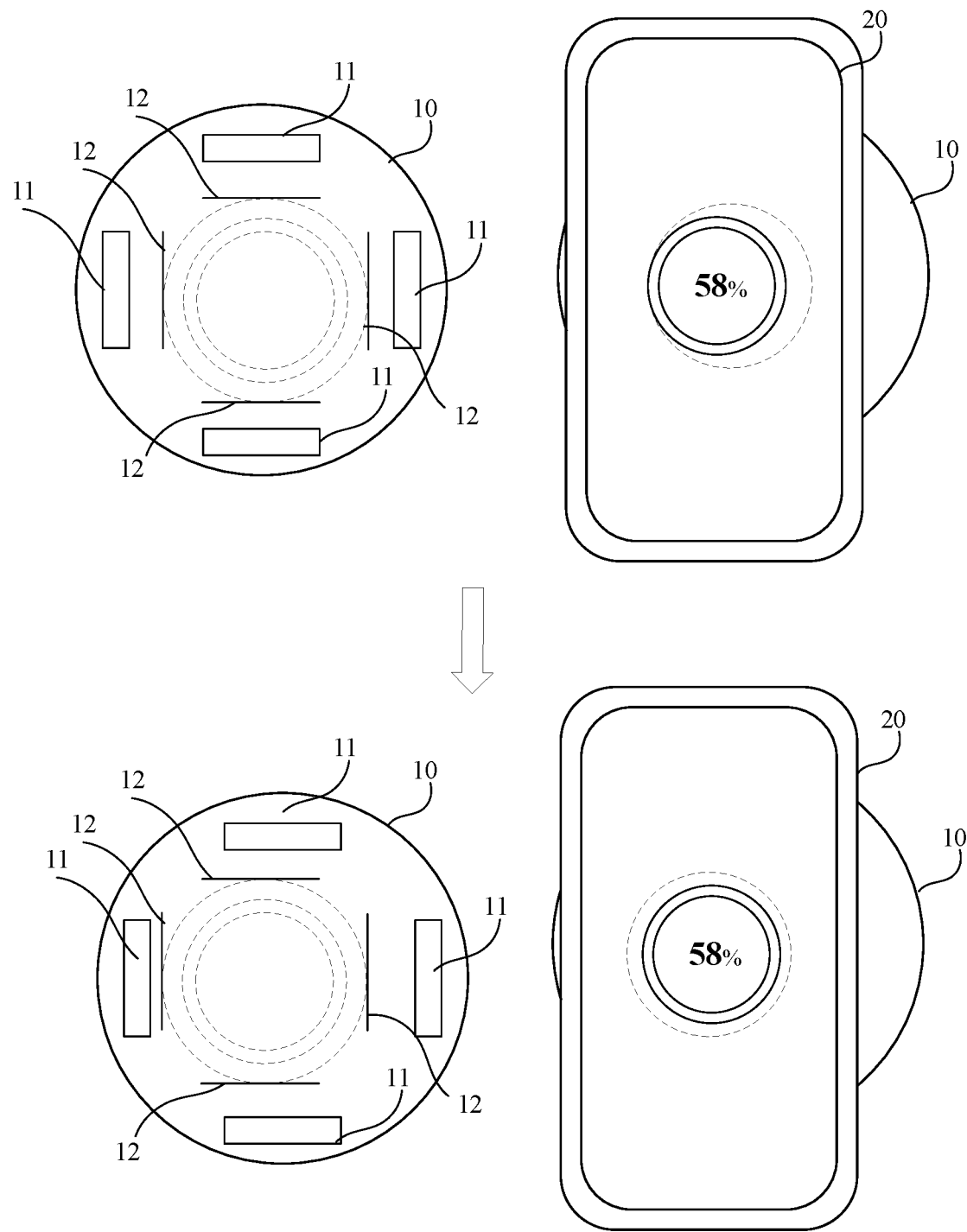
FIG. 3 exemplarily illustrates a schematic diagram of position adjustment of a transmitting coil.

FIG. 3 exemplarily illustrates a schematic diagram of position adjustment of a transmitting coil. Electromagnets 11 are arranged in the power transmitting device 10, and magnets 12 are arranged at positions corresponding to the electromagnets of the transmitting coil. As illustrated by the upper half in FIG. 3, when the power receiving device 20 is placed, as illustrated in FIG. 3, on the power transmitting device 10, the geometric center of the transmitting coil (the circle in broken line in FIG. 3 represents the transmitting coil) is not aligned with the geometric center of the receiving coil (the circle in solid line in FIG. 3 represents the receiving coil). The power transmitting device 10 determines that the transmitting coil is required to be adjusted by 2 mm to the left side according to the position offset indication information and then the power transmitting device 10 applies a corresponding current to the electromagnet 11 on the left side and applies no current to the electromagnets on the other three sides, such that an attraction force is generated between the electromagnet 11 on the left side and the transmitting coil, and the transmitting coil is moved to the left side by 2 mm. Of course, in other possible implementations, different currents may be applied to different electromagnets 11 as long as the final resultant force may cause the transmitting coil to move to the left until an effect as illustrated by the lower half in FIG. 3 is achieved.

As such, in some embodiments of the present disclosure, the coil position is adjusted by the power transmitting device according to the position offset between the transmitting coil and the receiving coil. If the power receiving device is not properly placed on the power transmitting device, the position of the transmitting coil is automatically adjusted, such that a geometric center of the transmitting coil coincides with or approaches that of the receiving coil as far as possible and thus improves the charging efficiency of the power receiving device.

In exemplary embodiments, the position adjustment of the transmitting coil has the following two cases.

In a first case, the power transmitting device determines the position offset indication information by itself, and adaptively adjusts the position of the transmitting coil.

In one example, the position offset indication information includes charging efficiency indication information.

In the embodiments of the present disclosure, the charging efficiency indication information is used to indicate a charging efficiency of wireless charging.

The charging efficiency indication information may be determined in the following approaches.

1. A transmitted power of the power transmitting device and a received power of the power receiving device are acquired.

The transmitted power of the power transmitting device may be determined according to a transmitted current and a transmitted voltage of the power transmitting device, and the received power of the power receiving device may be determined according to a received current and a received voltage of the power receiving device. For example, the transmitted power=the transmitted current*the transmitted voltage; and the received power=the received current*the received voltage.

2. A charging efficiency is calculated according to the transmitted power and the received power.

Exemplarily, the charging efficiency=the received power/the transmitted power=the received current*the received voltage/the transmitted current*the transmitted voltage.

3. The charging efficiency indication information is determined according to the charging efficiency.

Exemplarily, the charging efficiency indication information may refer to efficiency loss, wherein the efficiency loss may be determined according to a currently expected charging efficiency and the above charging efficiency, for example, the efficiency loss=the charging efficiency−the currently expected charging efficiency.

The currently expected charging efficiency is used to indicate a charging efficiency when the receiving coil is aligned with the transmitting coil under a current electric quantity. Since the charging efficiencies are different when the receiving coil is aligned with the transmitting coil under different electric quantities, a mapping relationship exists between the electric quantity and the expected charging efficiency. Therefore, in a case that the power transmitting device knows the current electric quantity, the currently expected charging efficiency may be determined according to the mapping between the electric quantity and the expected charging efficiency.

The position of the transmitting coil may be adjusted in the following approaches.

1. Whether the charging efficiency indication information satisfies a first predetermined condition is detected.

Assuming that the charging efficiency indication information is efficiency loss, the first predetermined condition may be that the efficiency loss is less than a first threshold; and assuming that the charging efficiency indication information is a charging efficiency, the first predetermined condition may be that the charging efficiency is less than a second threshold.

2. The position of the transmitting coil is adjusted if the charging efficiency indication information satisfies the first predetermined condition.

Assuming that the charging efficiency indication information is the efficiency loss, the efficiency loss takes a value of −5, the first threshold is −4, and the efficiency loss is less than the first threshold, the charging efficiency indication information satisfies the first predetermined condition, and the power transmitting device is required to adjust the position of the transmitting coil.

3. After the adjustment of the position of the transmitting coil, the charging efficiency indication information is re-acquired, and the step of detecting whether the charging efficiency indication information satisfies the first predetermined condition is performed again until the charging efficiency indication information does not satisfy the first predetermined condition, and the position adjustment of the transmitting coil is stopped.

Description is given still by using the above example as an example. Assuming that the power transmitting device firstly moves the transmitting coil to the left, the power transmitting device re-acquires the efficiency loss and in this case the efficiency loss is −4.5 which is less than −4 but greater than −5, and then it indicates that the adjustment direction of the transmitting coil is correct, and the power transmitting device may continue moving the transmitting coil to the left as long as the finally acquired efficiency is caused to be greater than −4. If the efficiency loss re-acquired by the power transmitting device is −6, which is less than −5, after the power transmitting device moves the transmitting coil to the left, it indicates that the adjustment direction of the transmitting coil is incorrect, and the transmitting coil needs to be moved to the right. If the efficiency loss re-acquired by the power transmitting device is −4.5, which is greater than −6 and less than −4, after the power transmitting device moves the transmitting coil to the right, it indicates that the adjustment direction at this time is correct and the power transmitting device needs to continue moving the transmitting coil to the right until the re-acquired efficiency loss is greater than −4.

After adjusting the position of the transmitting coil, the power transmitting device may re-acquire the charging efficiency indication information every a predetermined time period, and the step of detecting whether the charging efficiency indication information satisfies the first predetermined condition is performed again or the step of detecting whether the charging temperature indication information satisfies the second predetermined condition is performed again.

In another example, the position offset indication information further includes charging temperature indication information.

In the embodiment of the present disclosure, the charging temperature indication information is used to indicate a temperature of the power transmitting device.

The charging temperature indication information may be temperature loss, and the temperature loss may be determined according to a current temperature and a currently expected temperature. For example, the temperature loss=the current temperature−the currently expected temperature.

A temperature sensor is arranged in the power transmitting device. The current temperature may be determined by the temperature sensor. The currently expected temperature is used to indicate a temperature when the receiving coil is aligned with the transmitting coil under a current electric quantity. Since the temperatures are different when the receiving coil is aligned with the transmitting coil under different electric quantities, a mapping relationship exists between the electric quantity and the desired temperature. Therefore, in a case that the power transmitting device knows the current electric quantity, the currently expected temperature may be determined according to the mapping relationship between the electric quantity and the expected temperature.

The position of the transmitting coil may be adjusted in the following approaches.

1. Whether the charging temperature indication information satisfies a second predetermined condition is detected.

Assuming that the temperature indication information is temperature loss, the second predetermined condition may be that the temperature loss is greater than a third threshold; and assuming that the temperature indication information is a current temperature, the second predetermined condition may be that the charging efficiency is greater than a fourth threshold.

2. The position of the transmitting coil is adjusted if the charging temperature indication information satisfies the second predetermined condition. After the adjustment of the position of the transmitting coil, the charging temperature indication information is re-acquired, the step of detecting whether the charging temperature indication information satisfies the second predetermined condition is performed again until the charging efficiency indication information does not satisfy the first predetermined condition and the charging temperature indication information does not satisfy the second predetermined condition, and the position adjustment of the transmitting coil is stopped.

Assuming that the charging temperature indication information is the temperature loss, the temperature loss takes a value of 10, the third threshold is 5, and the temperature loss is greater than the third threshold, it indicates that the charging temperature indication information satisfies the second predetermined condition, and the power transmitting device needs to adjust the position of the transmitting coil. In this case, the efficiency loss is −5. Assuming that the power transmitting device firstly moves the transmitting coil to the left, the power transmitting device re-acquires the efficiency loss, and in this case the efficiency loss is −4.5 which is less than −4 but greater than −5 and the temperature loss takes a value of 8.8 which is greater than 5 but less than 10, it indicates that the adjustment direction of the transmitting coil is correct, and the power transmitting device may continue moving the transmitting coil to the left as long as the finally acquired efficiency loss is greater than the first threshold and the finally acquired temperature loss is less than the third threshold. If the temperature loss re-acquired by the power transmitting device is 12 which is greater than 10 after the power transmitting device moves the transmitting coil to the left, it indicates that the adjustment direction of the transmitting coil is incorrect, and the transmitting coil needs to be moved to the right. If the temperature loss re-acquired by the power transmitting device is 9 which is greater than 5 but less than 10 after the power transmitting device moves the transmitting coil to the right, it indicates that the adjustment direction of the transmitting coil is correct, and the power transmitting device needs to continue moving the transmitting coil to the right until the re-acquired efficiency loss is greater than −4 and the re-acquired temperature loss is less than 5.

It should be noted that in other possible implementations the power transmitting device may adjust the position of the transmitting coil until the charging temperature indication information does not satisfy the second predetermined condition, and the position adjustment of the transmitting coil is stopped.

Figure 4:
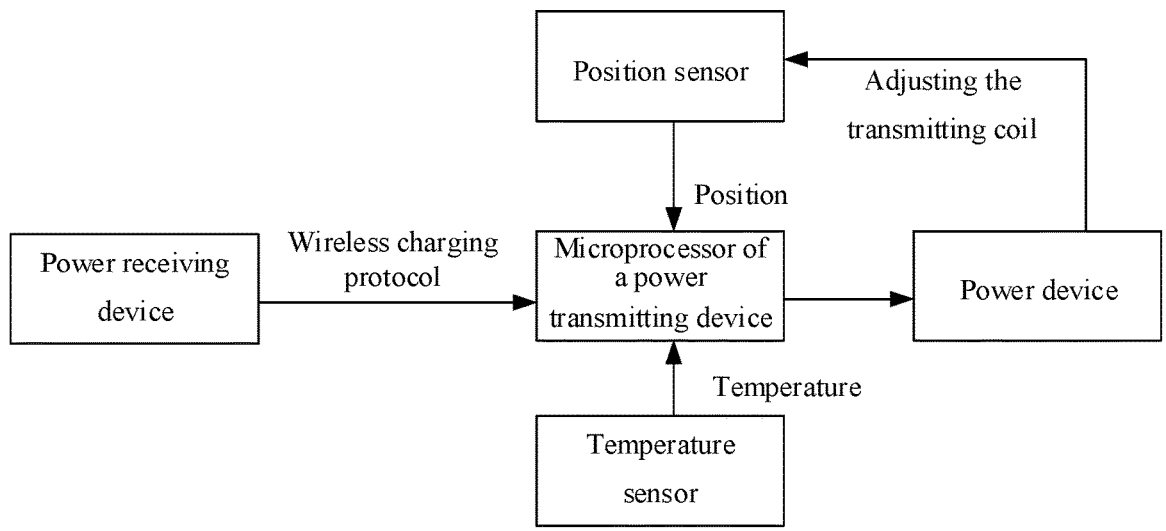
FIG. 4 exemplarily illustrates a schematic diagram of a closed-loop control system.

FIG. 4 exemplarily illustrates a schematic diagram of a closed-loop control system. The closed-loop control system includes a power receiving device, a microprocessor of a power transmitting device, a power device, a temperature sensor and a position sensor. The power receiving device transmits a current electric quantity and a received power to the microprocessor of the power transmitting device. The microprocessor determines the charging efficiency indication information according to the current electric quantity, the received power, and a transmitted power of the power transmitting device. The microprocessor determines charging temperature indication information according to the current electric quantity and a current temperature collected by the temperature sensor. The microprocessor detects whether the charging efficiency indication information satisfies a first predetermined condition, and whether the charging temperature indication information satisfies a second predetermined condition. If one of the predetermined conditions is satisfied, the microprocessor controls the power device to adjust the transmitting coil. The position sensor acquires a position of the adjusted transmitting coil, and transmits the position to the microprocessor. The microprocessor judges whether the adjusted transmitting coil satisfies a predetermined condition, and re-controls the power device to adjust the transmitting coil until the predetermined condition is not satisfied.

In a second case, the power receiving device transmits position offset indication information to the power transmitting device, and the power transmitting device adjust the position of the transmitting coil according to the position offset indication information transmitted by the power receiving device.

The power receiving device transmits a position adjustment parameter to the power transmitting device, and the position adjustment parameter is used to indicate an adjustment direction and an adjustment distance of the transmitting coil. The process of determining the position adjustment parameter may be referenced to the embodiments hereinafter, which is not described herein any further.

Correspondingly, the power transmitting device receives the position adjustment parameter transmitted by the power receiving device.

The position of the transmitting coil may be adjusted in the following approaches.

1. The adjustment direction and the adjustment distance are determined according to the position adjustment parameter.

2. The position of the transmitting coil is adjusted according to the adjustment direction and the adjustment distance.

In summary, in the technical solution according to the embodiment of the present disclosure, the power transmitting device may adjust the position of the transmitting coil in two ways, and thus flexibility of the adjustment is high. The power transmitting device adaptively adjusts the position of the transmitting coil, and no additional resource device needs to be arranged in the power receiving device. The position of the transmitting coil is adjusted according to the position adjustment parameter transmitted by the power receiving device. The transmitting coil may be efficiently adjusted to a proper position according to the adjustment direction and the adjustment distance and less time is consumed.

Figure 5:
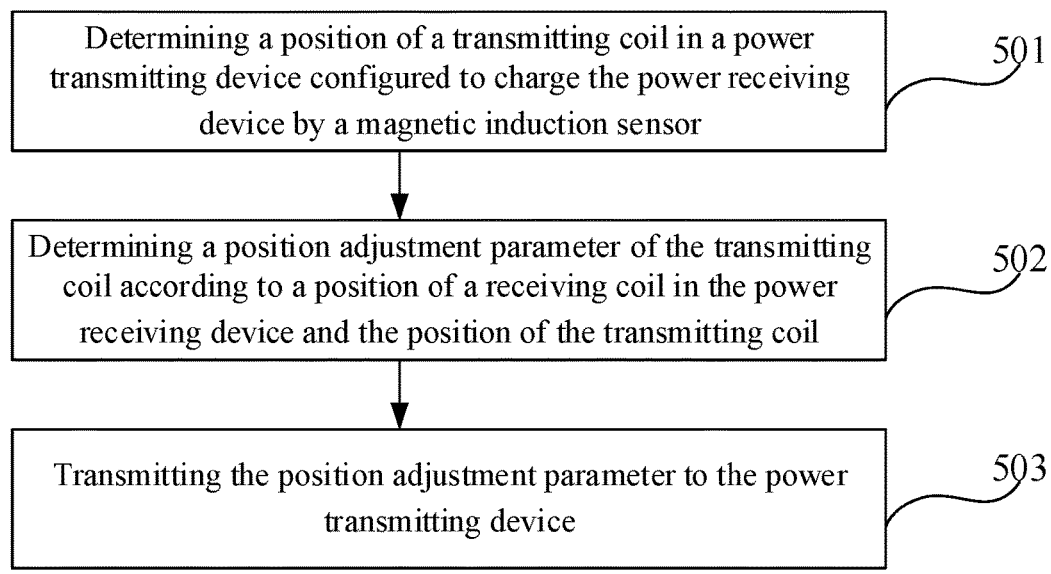
FIG. 5 is a flowchart of a method for adjusting a coil position according to another exemplary embodiment of the present disclosure.

FIG. 5 is a flowchart of a method for adjusting a coil position according to another exemplary embodiment of the present disclosure. The method can be applied to the power receiving device 20 as described above. The method can include the following steps (steps 501 to 503).

Step 501: a position of a transmitting coil in a power transmitting device configured to charge the power receiving device is determined by a magnetic induction sensor.

The magnetic induction sensor refers to a device capable of extracting information from a magnetic field, which may convert a magnetic signal to an electrical signal. In the embodiment of the present disclosure, a magnetic induction sensor may be arranged in the power receiving device, and the magnetic induction sensor may be arranged on the main board of the power receiving device. By the magnetic induction sensor, the power receiving device may determine the position of the transmitting coil in the power transmitting device.

Step 502: a position adjustment parameter of the transmitting coil is determined according to a position of a receiving coil in the power receiving device and the position of the transmitting coil.

In the embodiment of the present disclosure, the position adjustment parameter is used to indicate an adjustment direction and an adjustment distance of the transmitting coil.

After the position of the transmitting coil is determined, a position adjustment parameter of the power transmitting device may be determined in combination with the position of the receiving coil in the power receiving device. The position adjustment parameter is used to adjust a relative position between the receiving coil and the transmitting coil to align the receiving coil with the transmitting coil.

In a possible implementation, a relative position vector between the receiving coil and the transmitting coil may be directly calculated according to the position of the receiving coil and the position of the transmitting coil. The relative position vector includes a direction of the relative position and a distance of the relative position. Further, the position adjustment parameter of the power receiving device may be determined according to the relative position vector between the receiving coil and the transmitting coil.

In another possible implementation, the position adjustment parameter may be determined according to a first relative position vector between the receiving coil and the magnetic induction sensor, and a second relative position vector between the magnetic induction sensor and the transmitting coil. For introduction of this possible implementation, reference may be made to the embodiments hereinafter, which is not described herein any further.

Step 503: the position adjustment parameter is transmitted to the power transmitting device.

The power transmitting device receives the position adjustment parameter, and adjusts the position of the transmitting coil according to the position adjustment parameter.

In summary, in the technical solution according to the embodiment of the present disclosure, the position adjustment parameter of the transmitting coil is determined by the power receiving device according to the position of the receiving coil and the position of the transmitting coil, and the determined position parameter is transmitted to the power transmitting device, such that the power transmitting device adjusts the position of the transmitting coil according to the position adjustment parameter. In this way, adjustment of the position of the transmitting coil is quick and consumes less time.

In one example, the position of the transmitting coil may be determined as follows.

1. A magnetic field parameter of the magnet arranged in the power transmitting device is collected by the magnetic induction sensor.

In the embodiment of the present disclosure, the power transmitting device may be provided with a magnet. By a magnetic field generated by the magnet, the relative position between the power receiving device and the power transmitting device may be further adjusted.

The central position of the magnet is aligned with the central position of the transmitting coil.

In some embodiments, the magnet may be a circular magnet. In one aspect, when the magnet is a circular magnet, alignment of the central position with the central position of the transmitting coil is favorable to accurately determine the position of the transmitting coil. In another aspect, the circular magnet has a uniform magnetic field distribution, and thus facilitates the magnetic induction sensor to acquire the magnetic field parameter. In some other embodiments, the magnet may be in any other shapes, which is not limited in the embodiment of the present disclosure.

In addition, the magnet may also be arranged above the transmitting coil, or may also be arranged below the transmitting coil, which is not limited in the embodiment of the present disclosure.

In some embodiments, the power transmission may further include an isolation magnetic sheet, which may be configured for magnetic conduction, magnetic block, heat conduction, or the like. The isolation magnetic sheet may be a hard magnetic sheet or a soft magnetic sheet. In a case that the isolation magnetic sheet is a hard magnetic sheet, the magnetic sheet may be a ferrite sheet that is fabricated by high-temperature sintering and has a high magnetic permeability. In a case that the isolation magnetic sheet is a soft magnetic sheet, the magnetic sheet may be a soft magnetic sheet fabricated by alloy magnetic powder, plastic, rubber or the like and has merits such as soft textures, small thickness, and high customization degree.

Figure 6:
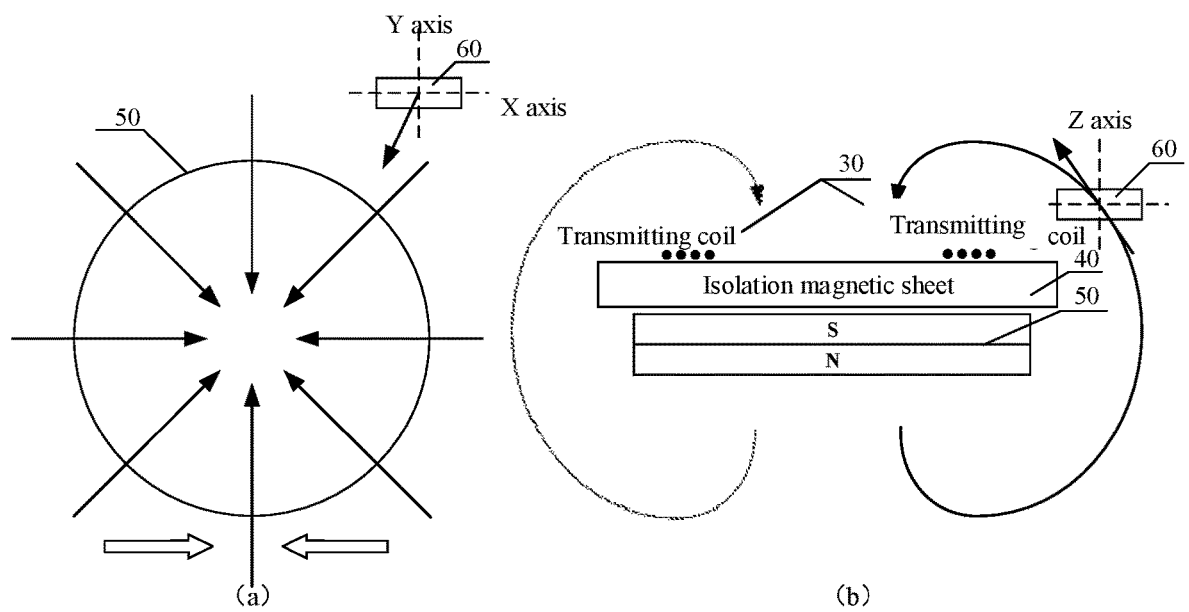
FIG. 6 exemplarily illustrates a schematic diagram of a magnetic field component.

Exemplarily, with reference to panel (b) in FIG. 6, a transmitting coil 30, an isolation magnetic sheet 40 and a magnet 50 are stacked in sequence from top to bottom, and centers of the transmitting coil 30, the isolation magnetic sheet 40 and the magnet 50 are on the same straight line.

2. The position of the transmitting coil is determined according to the magnetic field parameter of the magnet.

The magnetic field parameter of the magnet refers to a parameter relevant to the magnetic field generated by the magnet. The magnetic field parameter may include a magnetic field direction and a magnetic field magnitude. The magnetic field direction refers to a direction to which a magnetic induction line points, and the magnetic field magnitude refers to a magnetic field strength of the magnetic field.

Since the central position of the magnet is aligned with the central position of the transmitting coil of the power transmitting device, the direction of the magnetic field generates by the magnet points to the central position of the magnet, and also points to the central position of the transmitting coil. Therefore, after the magnetic induction sensor acquires the magnetic field parameter of the magnet, the position of the transmitting coil may be further determined according to the magnetic field parameter of the magnet.

2.1. A magnetic field component in a horizontal direction of the magnet is determined according to the magnetic field parameter of the magnet.

The magnetic field parameter of the magnet includes a magnetic field direction and a magnetic field magnitude. When the magnetic field generated by the magnet passes through the magnetic induction sensor, magnetic field components may be generated in different directions.

Exemplarily, with reference to panel (a) and panel (b) in FIG. 6, panel (a) illustrates a schematic diagram of a magnetic field component on an XY plane (that is, the horizontal direction), and panel (b) illustrates a schematic diagram of a magnetic field component in an Z axis. A magnet 50 is arranged below the transmitting coil 30 of the power transmitting device. When the power receiving device 20 is placed on the power transmitting device, a magnetic field generated by the magnet 50 may pass through a magnetic induction sensor 60 and magnetic field components are formed in an X axis, Y axis, and Z axis.

2.2 The position of the transmitting coil is determined according to the magnetic field component and a first mapping relationship.

When the magnetic induction sensor is away from the magnet in the power transmitting device, the magnetic induction sensor acquires a small magnetic field component; and when the magnetic induction sensor is close to the magnet in the power transmitting device, the magnetic induction sensor acquires a larger magnetic field component. Since the central position of the magnet is aligned with the central position of the transmitting coil in the power transmitting device, a certain mapping relationship exists between the magnetic field component and the position of the transmitting coil.

The first mapping relationship is used to describe the mapping relationship between the magnetic field component and the position of the transmitting coil. In a case that the magnetic field component is determined, the position of the transmitting coil is determined according to the first mapping relationship.

In some embodiments, before the position of the transmitting coil is determined according to the magnetic field component and the target mapping relationship, the first mapping relationship may be determined by the following steps.

(1) collecting n positions of the transmitting coil, n being an integer greater than 1;

(2) acquiring a magnetic field component corresponding to each of the n positions by the magnetic induction sensor; and (3) determining a target mapping relationship according to the n positions and the magnetic field components corresponding to the n positions.

The power receiving device may acquire n different positions of the transmitting coil, and the magnetic induction sensor acquires different magnetic field components at different positions. A mapping relationship, that is, the first mapping relationship, between the magnetic field component and the position of the transmitting coil may be obtained by fitting and according to the n positions and the magnetic field components corresponding to the n positions.

In another example, the position of the transmitting coil may also be determined as follows.

1. The magnetic field parameter of the transmitting coil is collected by the magnetic induction sensor.

The magnetic induction sensor refers to a device capable of extracting information from a magnetic field, which is capable of converting a magnetic signal to an electrical signal. In the embodiment of the present disclosure, a magnetic induction sensor may be arranged in the power receiving device, and the magnetic induction sensor may be arranged on the main board of the power receiving device. By the magnetic induction sensor, the power receiving device may acquire the magnetic field parameter of the transmitting coil in the power transmitting device.

In one example, a magnetic field parameter of a first magnetic field of the transmitting coil is collected by the magnetic induction sensor according to a first sampling frequency; and the magnetic field parameter of the transmitting coil is determined according to the magnetic field parameter of the first magnetic field collected by the sampling.

The first magnetic field is a magnetic field generated by the transmitting coil for wireless charging, that is, a magnetic field of the transmitting coil when the transmitting coil wirelessly charges the power receiving device. In this case, since an alternating current flows through the transmitting coil, the first magnetic field is also an alternating magnetic field. Exemplarily, a magnetic field parameter $\beta$ of the transmitting coil may be represented by:

$$\beta = A \sin(2\pi f^* t + \theta)$$

A represents an amplitude, f represents a frequency of the alternating current in the transmitting coil, t represents time, and $\theta$ represents a phase angle.

In this case, according to the sampling theorem, when a first sampling frequency of the magnetic inductor sensor in the power receiving device is greater than or equal to 2f, the magnetic field parameters collected by the magnetic induction sensor may include all the magnetic field parameters of the first magnetic field of the transmitting coil, and by the collected magnetic field parameters, the magnetic field parameters of the first magnetic field of the transmitting coil may be restored. The above sampling theorem may also be referred to as Shannon sampling theorem or Nyquist sampling theorem. This sampling theorem indicates that when the sampling frequency is greater than or equal to twice of a maximum frequency of a valid signal, a sampling value may include all the information of the original signal and a sampled signal may be restored to the original signal without any distortion.

The magnetic induction sensor acquires a plurality of magnetic field parameters of the first magnetic field of the transmitting coil according to the first sampling frequency, and further obtains, by fitting, a change curve of the magnetic field parameter of the first magnetic field with the time. According to the change curve, an amplitude (maximum value) of the magnetic field parameters of the first magnetic field may be collected, and thus the amplitude is determined as the magnetic field parameter of the transmitting coil.

In addition, when the plurality of magnetic field parameters collected by the magnetic induction sensor includes the above amplitude, the amplitude from the plurality of magnetic field parameters may be directly determined as the magnetic field parameter of the transmitting coil.

In another example, a magnetic field parameter of a second magnetic field of the transmitting coil is collected by the magnetic induction sensor according to a second sampling frequency, and the second magnetic field refers to another magnetic field generated by the transmitting coil in addition to the magnetic field used for wireless charging. The magnetic field parameter of the transmitting coil is determined according to the magnetic field parameter of the second magnetic field collected by sampling.

In the wireless communication protocols, the transmitting coil may generate another magnetic field, for example, a second magnetic field, in addition to the magnetic field for wireless charging. The second magnetic field is also an alternating magnetic field, and a variation frequency of the second magnetic field is lower than that of the first magnetic field.

In this case, the magnetic induction sensor in the power receiving device may collect the magnetic field parameters of the second magnetic field of the transmitting coil according to the second sampling frequency. The second sampling frequency is greater than or equal to twice of the variation frequency of the second magnetic field.

The magnetic induction sensor acquires a plurality of magnetic field parameters of the second magnetic field of the transmitting coil according to the second sampling frequency, and further obtains, by fitting, a change curve of the magnetic field parameter of the second magnetic field with the time. According to the change curve, an amplitude (maximum value) of the magnetic field parameters of the second magnetic field may be acquired, and thus the amplitude is determined as the magnetic field parameter of the transmitting coil.

In addition, when the plurality of magnetic field parameters collected by the magnetic induction sensor includes the above amplitude, the amplitude from the plurality of magnetic field parameters may be directly determined as the magnetic field parameter of the transmitting coil.

According to the above embodiment, when the sampling frequency of the magnetic induction sensor is less than twice of the variation frequency of the first magnetic field, the transmitting coil may additionally generate another magnetic field in addition to the magnetic field for wireless charging, and the magnetic field parameter of the transmitting coil may be determined according to the magnetic parameter of the magnetic field.

2. The position of the transmitting coil is determined according to the magnetic field parameter of the transmitting coil.

The magnetic field parameter of the transmitting coil refers to a parameter relevant to the magnetic field generated by the transmitting coil. The magnetic field parameter may include a magnetic field direction and a magnetic field magnitude. The magnetic field direction refers to a direction pointed by a magnetic induction line, and the magnetic field magnitude refers to a magnetic field strength of the magnetic field.

After the magnetic induction sensor acquires the magnetic field parameter of the transmitting coil, the position of the transmitting coil may be further determined according to the magnetic field parameter of the transmitting coil.

2.1. A magnetic field component in a horizontal direction of the transmitting coil is determined according to the magnetic field parameter of the transmitting coil.

The magnetic field parameter of the transmitting coil includes a magnetic field direction and a magnetic field magnitude. When the magnetic field generated by the transmitting coil passes through the magnetic induction sensor, magnetic field components may be generated in different directions. When the power receiving device is placed on the power transmitting device, a magnetic field generated by the transmitting coil may pass through a magnetic induction sensor, and magnetic field components are formed in an X axis, Y axis, and Z axis.

2.2 The position of the transmitting coil is determined according to the magnetic field component and a second mapping relationship.

When the magnetic induction sensor is away from the transmitting coil in the power transmitting device, the magnetic induction sensor acquires a small magnetic field component; and when the magnetic induction sensor is close to the transmitting coil in the power transmitting device, the magnetic induction sensor acquires a larger magnetic field component. Therefore, a certain mapping relationship exists between the magnetic field component and the position of the transmitting coil.

The second mapping relationship is used to describe the mapping relationship between the magnetic field component and the position of the transmitting coil. In a case that the magnetic field component is determined, the position of the transmitting coil may be determined according to the second mapping relationship.

In some embodiments, the position adjustment parameter may be determined according to a first relative position vector between the receiving coil and the magnetic induction sensor, and a second relative position vector between the magnetic induction sensor and the transmitting coil.

Since the magnetic induction sensor and the receiving coil are both arranged on the power receiving device, the first relative position vector between the receiving coil and the magnetic induction sensor is known and fixed. In addition, after the position of the transmitting coil is acquired, the second relative position vector between the magnetic induction sensor and the transmitting coil may be further acquired, and hence the position adjustment parameter may be determined.

The relative position vector includes a relative position distance and a relative position direction. The position adjustment parameter includes an adjustment direction and an adjustment direction, and the adjustment direction points to the central position of the transmitting coil.

Figure 7:
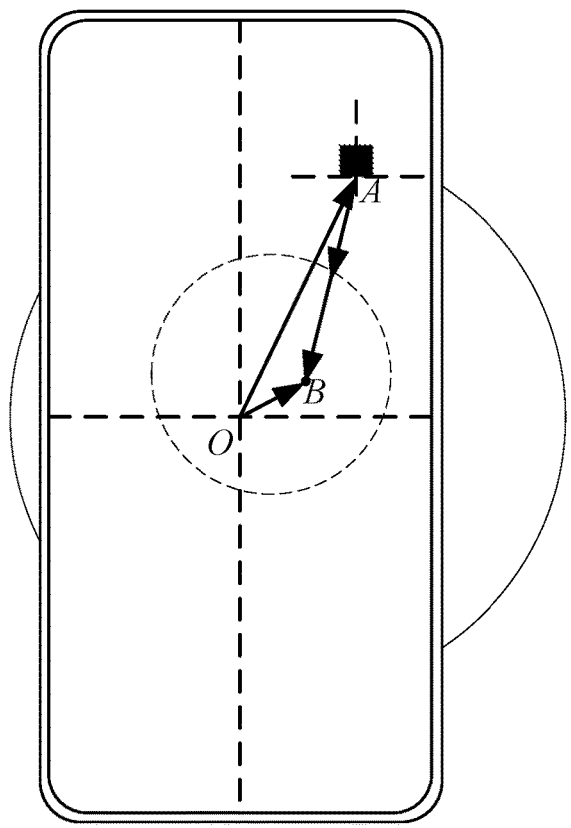
FIG. 7 exemplarily illustrates a schematic diagram of a position adjustment parameter.

Exemplarily, with reference to FIG. 7, a coordinate system is established with the center of the receiving coil, and the relative position relationships between the receiving coil, the magnetic induction sensor and the transmitting coil are described by using the coordinate system. Point O represents the position of the receiving coil, point A represents the position of the magnetic induction sensor, and point B represents the position of the transmitting coil. Vector OA represents the first relative position vector between the receiving coil and the magnetic induction sensor, and vector AB represents the second relative position vector between the magnetic induction sensor and the transmitting coil. According to the vector calculation laws, vector OB may be obtained, and the vector OB represents the position adjustment parameter.

Apparatus embodiments according to the present disclosure are described hereinafter, and apparatuses in the embodiments hereinafter may be used for performing the method embodiments. Details that are not disclosed in the apparatus embodiments may be referenced to the method embodiments.

Figure 8:
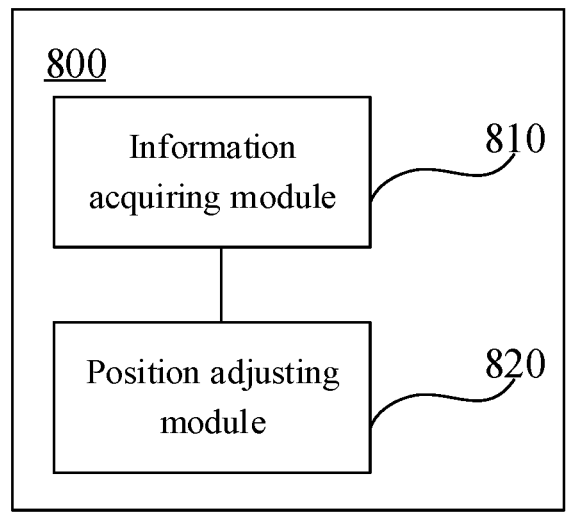
FIG. 8 is a block diagram of an apparatus for adjusting a coil position according to some embodiments of the present disclosure.

FIG. 8 is a block diagram of a coil position adjustment apparatus 800 according to some embodiments of the present disclosure. The apparatus has the functions of realizing the above method examples. The functions may be implemented by hardware, or may be implemented by software which is performed by the hardware. The apparatus may be the power transmitting device as described above or may be arranged on the power transmitting device. As illustrated in FIG. 8, the apparatus 800 may include an information acquiring module 810 and a position adjusting module 820.

The information acquiring module 810 is configured to acquire position offset indication information between a transmitting coil in the power transmitting device and a receiving coil in a power receiving device. The power transmitting device is configured to wirelessly charge the power receiving device, and the position offset indication information is used to reflect a position offset between the transmitting coil and the receiving coil.

The position adjusting module 820 is configured to adjust a position of the transmitting coil according to the position offset indication information.

As such, in the technical solution according to the embodiment of the present disclosure, the coil position is adjusted by the power transmitting device according to the position offset between the transmitting coil and the receiving coil. If the power receiving device is not properly placed on the power transmitting device, the position of the transmitting coil is automatically adjusted, such that a geometric center of the transmitting coil coincides with or approaches that of the receiving coil as far as possible. In this way, the charging efficiency of the power receiving device is improved.

In some embodiments, the position offset indication information includes charging efficiency indication information, and the charging efficiency indication information is used to indicate a charging efficiency of the wireless charging.

Figure 9:
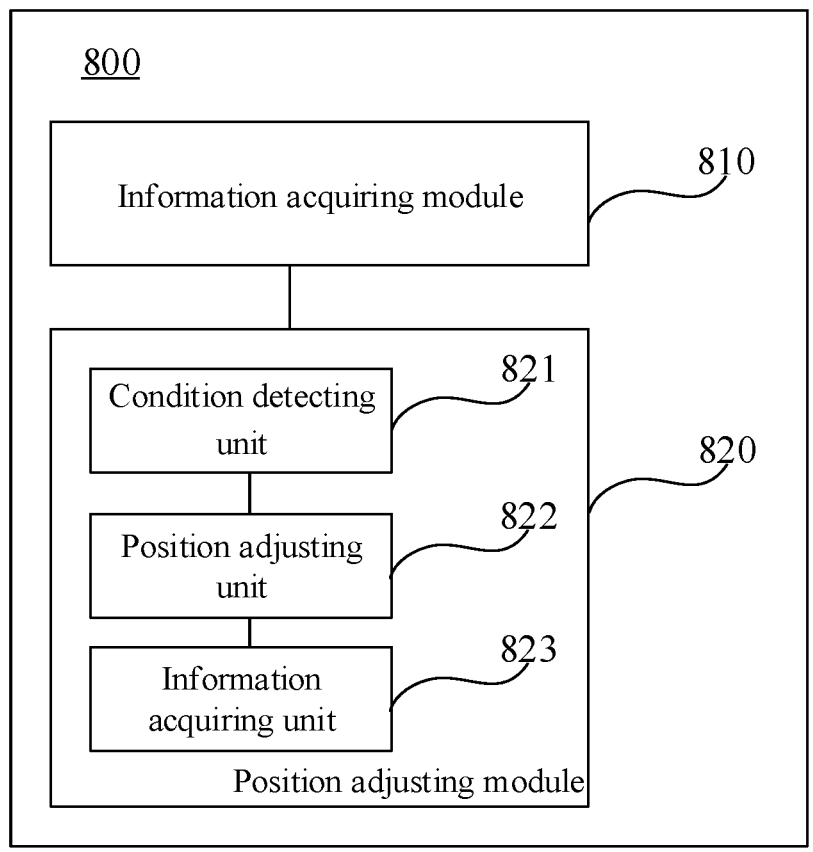
FIG. 9 is a block diagram of an apparatus for adjusting a coil position according to another exemplary embodiment of the present disclosure.

As illustrated in FIG. 9, the position adjusting module 820 includes a condition detecting component 821, a position adjusting component 822, and an information acquiring component 823.

The condition detecting component 821 is configured to detect whether the charging efficiency indication information satisfies a first predetermined condition.

The position adjusting component 822 is configured to adjust the position of the transmitting coil if the charging efficiency indication information satisfies the first predetermined condition.

The information acquiring component 823 is configured to re-acquire the charging efficiency indication information after the adjustment of the position of the transmitting coil, and detect whether the charging efficiency indication information satisfies the first predetermined condition by the condition detecting component until the charging efficiency indication information does not satisfy the first predetermined condition, and the position adjustment of the transmitting coil is stopped.

In some embodiments, the information acquiring module 810 is configured to:

acquire a transmitted power of the power transmitting device and a received power of the power receiving device;

calculate a charging efficiency according to the transmitted power and the received power; and determine the charging efficiency indication information according to the charging efficiency.

In some embodiments, the position offset indication information further includes charging temperature indication information, and the charging temperature indication information is used to indicate a temperature of the power transmitting device.

The condition detecting component 821 is further configured to detect whether the charging temperature indication information satisfies a second predetermined condition.

The position adjusting component 822 is further configured to adjust the position of the transmitting coil if the charging temperature indication information satisfies the second predetermined condition.

The information acquiring component is further configured to re-acquire the charging temperature indication information after the adjustment of the position of the transmitting coil, and re-detect whether the charging temperature indication information satisfies the second predetermined condition by the condition detecting component until the charging efficiency indication information does not satisfy the first predetermined condition and the charging temperature indication information does not satisfy the second predetermined condition, and the position adjustment of the transmitting coil is stopped.

In some embodiments, the information acquiring module 810 is further configured to:

receive a position adjustment parameter from the power receiving device, and the position adjustment parameter is used to indicate an adjustment direction and an adjustment distance of the transmitting coil.

In some embodiments, the position adjusting module 820 is further configured to:

determine the adjustment direction and an adjustment distance of the transmitting coil according to the position adjustment parameter; and adjust the position of the transmitting coil according to the adjustment direction and the adjustment distance.

Figure 10:
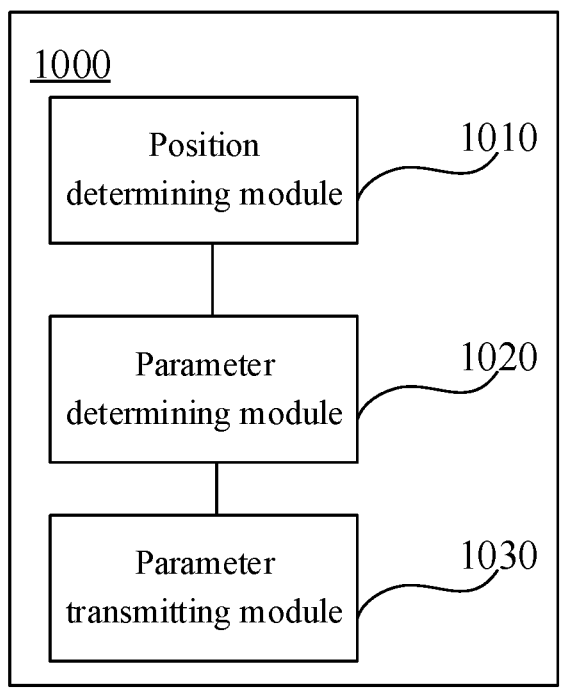
FIG. 10 is a block diagram of an apparatus for adjusting a coil position according to another exemplary embodiment of the present disclosure.

FIG. 10 is a block diagram of an apparatus for adjusting a coil position according to another exemplary embodiment of the present disclosure. The apparatus has the functions of realizing the above method examples. The functions may be implemented by hardware, or may be implemented by corresponding software which is performed by hardware. The apparatus may be the power receiving device as described above or may be arranged on the power receiving device. As illustrated in FIG. 10, the apparatus 1000 may include a position determining module 1010, a parameter determining module 1020, and a parameter transmitting module 1030.

The position determining module 1010 is configured to determine a position of a transmitting coil in a power transmitting device configured to wirelessly charge the power receiving device by a magnetic induction sensor.

The parameter determining module 1020 is configured to determine a position adjustment parameter of the transmitting coil according to a position of a receiving coil in the power receiving device and a position of the transmitting coil, and the position adjustment parameter is used to indicate an adjustment direction and an adjustment distance of the transmitting coil.

The parameter transmitting module 1030 is configured to transmit the position adjustment parameter to the power transmitting device.

As such, in some embodiments of the present disclosure, the position adjustment parameter of the transmitting coil is determined by the power receiving device according to the position of the receiving coil and the position of the transmitting coil, and the position adjustment parameter is transmitted to the power transmitting device, such that the power transmitting device adjusts the position of the transmitting coil according to the position adjustment parameter. In this way, adjustment of the position of the transmitting coil is quick and consumes less time.

Figure 11:
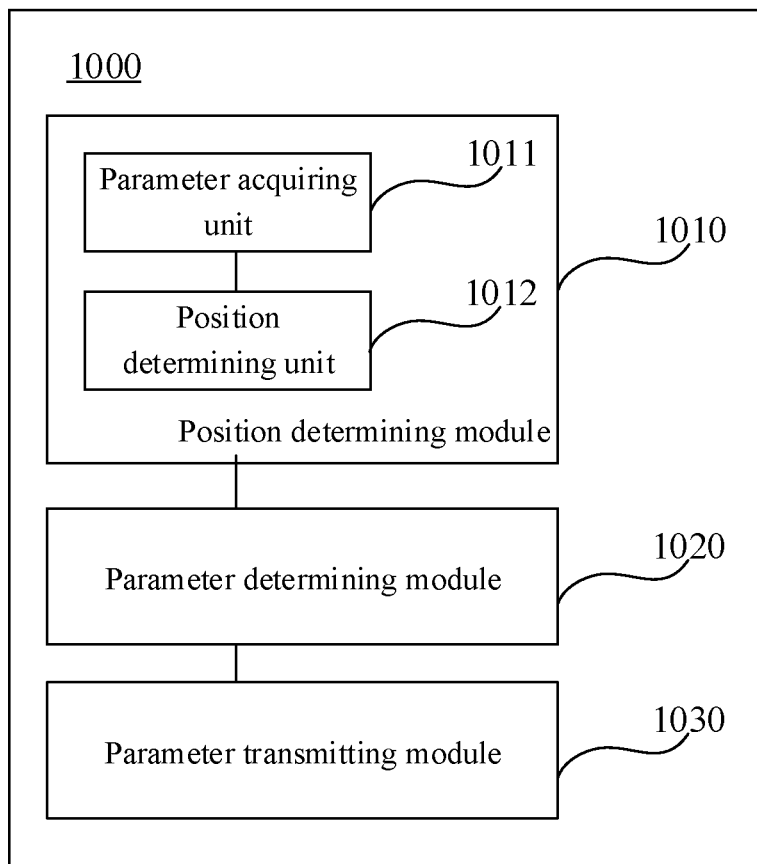
FIG. 11 is a block diagram of an apparatus for adjusting a coil position according to another exemplary embodiment of the present disclosure.

In some embodiments, as illustrated in FIG. 11, the position determining module 1010 includes a parameter acquiring component 1011 and a position determining component 1012.

The parameter acquiring component 1011 is configured to acquire a magnetic field parameter of a magnet in the power transmitting device by the magnetic induction sensor, and a central position of the magnet is aligned with a central position of the transmitting coil.

The position determining component 1012 is configured to determine the position of the transmitting coil according to the magnetic field parameter of the magnet.

In some embodiments, the position determining module 1012 is configured to:

determine a magnetic field component in a horizontal direction of the magnet according to the magnetic field parameter of the magnet, and the magnetic field parameter includes a magnetic field direction and a magnetic field magnitude; and determine the position of the transmitting coil according to the magnetic field component and a first mapping relationship, the first mapping relationship being used to describe mapping between the magnetic field component and the position of the transmitting coil.

In some embodiments, the position determining module 1010 includes:

a parameter acquiring component 1011, configured to acquire a magnetic field parameter of the transmitting coil by a magnetic induction sensor; and a position determining component 1012, configured to determine the position of the transmitting coil according to the magnetic field parameter of the transmitting coil.

In some embodiments, the parameter determining module 1011 is configured to:

collect a magnetic field parameter of a first magnetic field of the transmitting coil by the magnetic induction sensor according to a first sampling frequency, the first magnetic field being a magnetic field generated by the transmitting coil for wireless charging; and determine the magnetic field parameter of the transmitting coil according to the magnetic field parameter of the first magnetic field acquired by sampling;

or collect a magnetic field parameter of a second magnetic field of the transmitting coil by the magnetic induction sensor according to a second sampling frequency, the second magnetic field being another magnetic field generated by the transmitting coil in addition to the magnetic field for wireless charging; and determine the magnetic field parameter of the transmitting coil according to the magnetic field parameter of the second magnetic field acquired by sampling.

In some embodiments, the position determining module 1012 is configured to:

determine a magnetic field component in a horizontal direction of the transmitting coil according to the magnetic field parameter of the transmitting coil, the magnetic field parameter of the transmitting coil including a magnetic field direction and a magnetic field magnitude; and determine the position of the transmitting coil according to the magnetic field component and a second mapping relationship, the second mapping relationship being used to describe mapping between the magnetic field component and the position of the transmitting coil.

It should be noted that, during implementation of the functions of the apparatus according to the above embodiment, the apparatus is described by only using division of the above functional modules as examples. In practice, the functions may be assigned to different functional modules for implementation as required. To be specific, the internal structure of the apparatus is divided into different functional modules to implement all or part of the above-described functions.

With respect to the apparatus in the above embodiment, details about performing corresponding operations by different modules have been described in the method embodiment, which are not given herein any further.

Some embodiments of the present disclosure further provide a device for use in coil position adjustment, which may implement the method according to the present disclosure. The apparatus has the functions of practicing the above method examples. The functions may be implemented by hardware, or may be implemented by corresponding software which is performed by hardware. The apparatus may be the power transmitting device as described above or may be arranged on the power transmitting device. The device includes a processor and a memory for storing executable instructions. The processor is configured to:

acquire position offset indication information between a transmitting coil in the power transmitting device and a receiving coil in a power receiving device; wherein the power transmitting device is configured to wirelessly charge the power receiving device, and the position offset indication information is used to reflect a position offset between the transmitting coil and the receiving coil; and adjust a position of the transmitting coil according to the position offset indication information.

In some embodiments, the position offset indication information includes charging efficiency indication information, and the charging efficiency indication information is used to indicate a charging efficiency of the wireless charging; and The processor is configured to:

detect whether the charging efficiency indication information satisfies a first predetermined condition;

adjust the position of the transmitting coil if the charging efficiency indication information satisfies the first predetermined condition; and after the adjustment of the position of the transmitting coil, re-acquire the charging efficiency indication information, perform the step of detecting whether the charging efficiency indication information satisfies the first predetermined condition again until the charging efficiency indication information does not satisfy the first predetermined condition, and stop adjusting the position of the transmitting coil.

In some embodiments, the processor is configured to:

acquire a transmitted power of the power transmitting device and a received power of the power receiving device;

calculate a charging efficiency according to the transmitted power and the received power; and determine the charging efficiency indication information according to the charging efficiency.

In some embodiments, the position offset indication information further includes charging temperature indication information, and the charging temperature indication information is used to indicate a temperature of the power transmitting device; and the processor is further configured to:

detect whether the charging temperature indication information satisfies a second predetermined condition;

adjust the position of the transmitting coil if the charging temperature indication information satisfies the second predetermined condition; and after the adjustment of the position of the transmitting coil, re-acquire the charging temperature indication information, re-perform the step of detecting whether the charging temperature indication information satisfies the second predetermined condition until the charging efficiency indication information does not satisfy the first predetermined condition and the charging temperature indication information does not satisfy the second predetermined condition, and stop adjusting the position of the transmitting coil.

In some embodiments, the processor is further configured to:

receive a position adjustment parameter from the power receiving device, the position adjustment parameter being used to indicate an adjustment direction and an adjustment distance of the transmitting coil.

In some embodiments, the processor is further configured to:

determine the adjustment direction and an adjustment distance of the transmitting coil according to the position adjustment parameter; and adjust the position of the transmitting coil according to the adjustment direction and the adjustment distance.

Some embodiments of the present disclosure further provide a device for adjusting the coil position, which may implement the method according to the present disclosure. The apparatus has the functions of realizing the above method examples. The functions may be implemented by hardware, or may be implemented by corresponding software which is performed by hardware. The apparatus may be the power receiving device as described above or may be arranged on the power receiving device. The device includes a processor and a memory for storing executable instructions. The processor is configured to:

determine a position of a transmitting coil in a power transmitting device configured to charge the power receiving device by a magnetic induction sensor;

determine a position adjustment parameter of the transmitting coil according to a position of a receiving coil in the power receiving device and the position of the transmitting coil, wherein the position adjustment parameter is used to indicate an adjustment direction and an adjustment distance of the transmitting coil; and transmit the position adjustment parameter to the power transmitting device.

In some embodiments, the processor is configured to:

acquire a magnetic field parameter of a magnet arranged in the power transmitting device by the magnetic induction sensor, wherein a central position of the magnet is aligned with a central position of the transmitting coil; and determine the position of the transmitting coil according to the magnetic field parameter of the magnet.

In some embodiments, the processor is further configured to:

determine a magnetic field component in a horizontal direction of the magnet according to the magnetic field parameter of the magnet, the magnetic field parameter including a magnetic field direction and a magnetic field magnitude; and determine the position of the transmitting coil according to the magnetic field component and a first mapping relationship, and the first mapping relationship being used to describe mapping between the magnetic field component and the position of the transmitting coil.

In some embodiments, the processor is further configured to:

acquire a magnetic field parameter of the transmitting coil by a magnetic induction sensor; and determine the position of the transmitting coil according to the magnetic field parameter of the transmitting coil.

In some embodiments, the processor is further configured to:

collect a magnetic field parameter of a first magnetic field of the transmitting coil by the magnetic induction sensor according to a first sampling frequency, the first magnetic field being a magnetic field generated by the transmitting coil for wireless charging; and determine the magnetic field parameter of the transmitting coil according to the magnetic field parameter of the first magnetic field acquired by sampling;

or acquire a magnetic field parameter of a second magnetic field of the transmitting coil by the magnetic induction sensor according to a second sampling frequency, the second magnetic field being another magnetic field generated by the transmitting coil in addition to the magnetic field for wireless charging; and determine the magnetic field parameter of the transmitting coil according to the magnetic field parameter of the second magnetic field acquired by sampling.

In some embodiments, the processor is further configured to:

determine a magnetic field component in a horizontal direction of the transmitting coil according to the magnetic field parameter of the transmitting coil, the magnetic field parameter of the transmitting coil including a magnetic field direction and a magnetic field magnitude; and determine the position of the transmitting coil according to the magnetic field component and a second mapping relationship, the second mapping relationship being used to describe mapping between the magnetic field component and the position of the transmitting coil.

Figure 12:
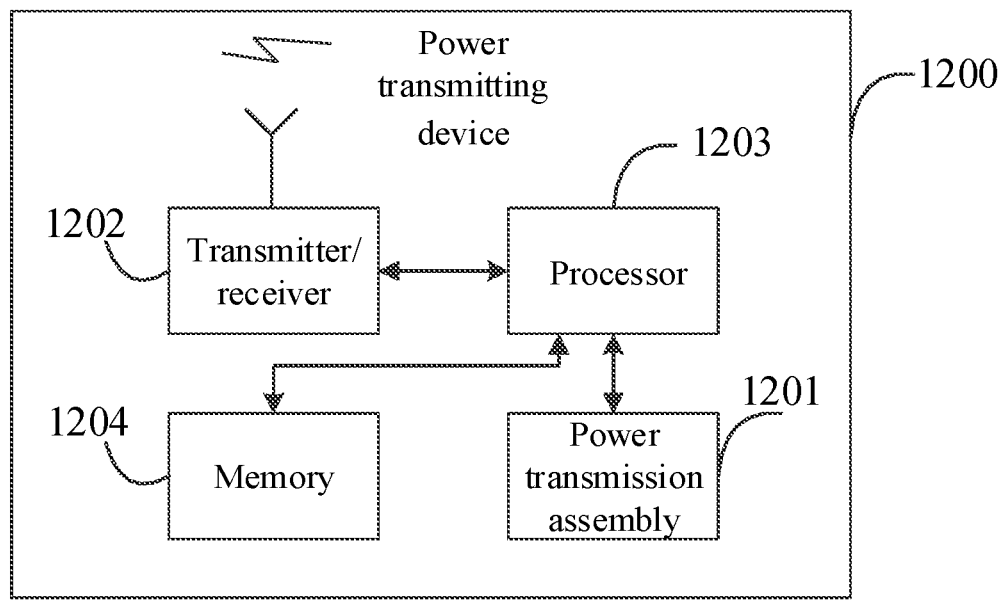
FIG. 12 is a schematic structural diagram of a power transmitting device according to some embodiments of the present disclosure.

FIG. 12 is a schematic structural diagram of a power transmitting device 1200 according to some embodiments of the present disclosure. The power transmitting device 1200 may include a power transmission assembly 1201, a transmitter/receiver 1202, and a processor 1203.

The power transmission assembly 1201 is configured to wirelessly charge a power receiving device. The power transmission assembly 1201 may wirelessly charge the power receiving device by electromagnetic induction. In the embodiment of the present disclosure, no limitation is set to the constitution and structure of the power transmission assembly 1201.

The transmitter/receiver 1202 is configured to support communication between the power transmitting device 1200 and other devices (for example, the power receiving device and/or other power transmitting devices).

The processor 1203 controls and manages the action of the power transmitting device 1200, and is configured to perform the operations of the power transmitting device 1200. For example, the processor 1203 may be further configured to perform the steps in the above method embodiments, and/or other steps in the technical solutions described in the embodiments of the present disclosure.

Further, the power transmitting device 1200 may include a memory 1204, wherein the memory 1204 is configured to store program code and data of the power transmitting device 1200.

It may be understood that FIG. 12 only illustrates a simplified design of the power transmitting device 1200. In practical application, the power transmitting device 1200 may include more or fewer components, and all the power transmitting devices that may realize the embodiments of the present disclosure shall fall within the protection scope of the embodiments of the present disclosure.

Figure 13:
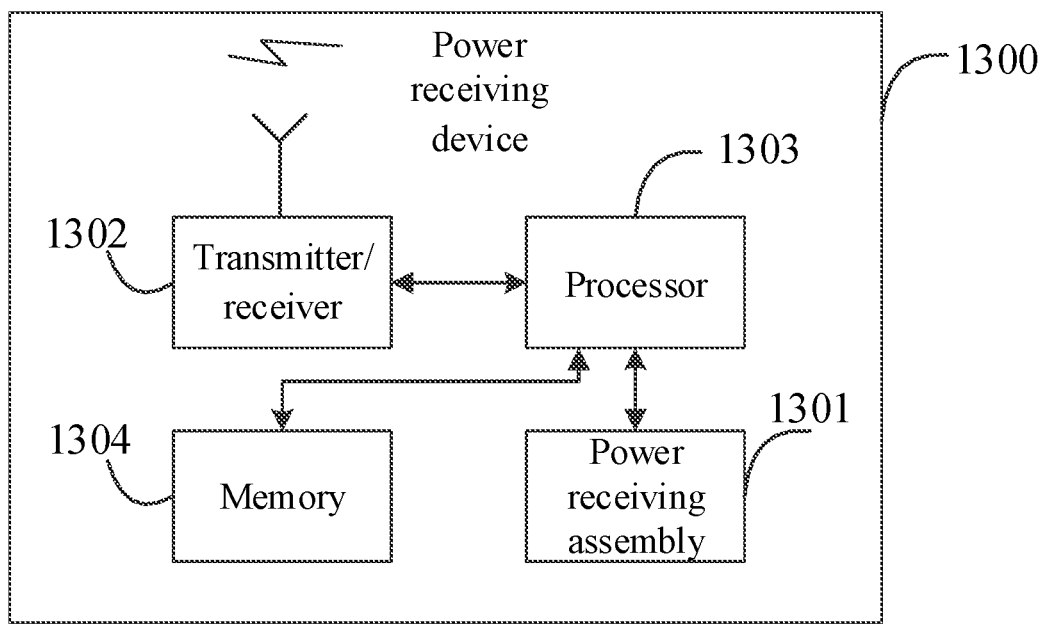
FIG. 13 is a schematic structural diagram of a power receiving device according to some embodiments of the present disclosure.

FIG. 13 is a schematic structural diagram of a power receiving device 1300 according to some embodiments of the present disclosure. The power receiving device 1300 may include a power receiving assembly 1301, a transmitter/receiver 1302, and a processor 1303.

The power receiving assembly 1301 is configured to receive a wireless charging power supplied by the power transmitting device. The power receiving assembly 1301 may receive, by electromagnetic induction, the wireless charging power supplied by the power transmitting device. In the embodiment of the present disclosure, no limitation is set to the constitution and structure of the power receiving assembly 1301.

The transmitter/receiver 1302 is configured to support communication between the power receiving device 1300 and other devices (for example, the power transmitting device and/or other power receiving devices).

The processor 1303 controls and manages the action of the power receiving device 1300, and is configured to perform the operations of the power receiving device 1300. For example, the processor 1303 may be further configured to perform the steps in the above method embodiments, and/or other steps in the technical solutions described in the embodiments of the present disclosure.

Further, the power receiving device 1300 may include a memory 1304, wherein the memory 1304 is configured to store program code and data of the power receiving device 1300.

It may be understood that FIG. 13 only illustrates a simplified design of the power receiving device 1300. In practical application, the power receiving device 1300 may include more or fewer components, and all the power receiving devices that may practice the embodiments of the present disclosure shall fall within the protection scope of the embodiments of the present disclosure.

An embodiment of the present disclosure further provides a non-transitory computer-readable storage medium which stores a computer program. When the computer program is performed by a processor of a power transmitting device, the above-mentioned method for adjusting a coil position on the power transmitting device side is realized.

An embodiment of the present disclosure further provides a non-transitory computer-readable storage medium which stores a computer program. When the computer program is performed by a processor of a power transmitting device, the above-mentioned method for adjusting a coil position on the power receiving device side is realized.

In some embodiments, the non-transitory computer-readable storage medium may be a ROM (Read-Only Memory), a RAM (Random Access Memory), a CD-ROM, a magnetic tape, a floppy disc, an optical data storage device, and the like.

The processor can execute the instructions stored on the medium to determine, by a magnetic induction sensor, a position of a transmitting coil in a power transmitting device configured to wirelessly charge the power receiving device; determine a position adjustment parameter of the transmitting coil according to a position of a receiving coil in the power receiving device and the position of the transmitting coil, wherein the position adjustment parameter is used to indicate an adjustment direction and an adjustment distance of the transmitting coil; and transmit the position adjustment parameter to the power transmitting device.

In some embodiments, the position offset indication information includes charging efficiency indication information, the charging efficiency indication information being used to indicate a charging efficiency of the wireless charging; and adjusting the position of the transmitting coil according to the position offset indication information includes:

detecting whether the charging efficiency indication information satisfies a first predetermined condition;

adjusting the position of the transmitting coil if the charging efficiency indication information satisfies the first predetermined condition; and after the adjustment of the position of the transmitting coil, re-acquiring the charging efficiency indication information, re-performing the step of detecting whether the charging efficiency indication information satisfies the first predetermined condition until the charging efficiency indication information does not satisfy the first predetermined condition, and stopping adjusting the position of the transmitting coil.

In some embodiments, the acquiring the position offset indication information between the transmitting coil in the power transmitting device and the receiving coil in the power receiving device includes:

acquiring a transmitted power of the power transmitting device and a received power of the power receiving device;

calculating a charging efficiency according to the transmitted power and the received power; and determining the charging efficiency indication information according to the charging efficiency.

In some embodiments, the position offset indication information further includes charging temperature indication information, the charging temperature indication information is used to indicate a temperature of the power transmitting device; and the method further includes:

detecting whether the charging temperature indication information satisfies a second predetermined condition;

adjusting the position of the transmitting coil if the charging temperature indication information satisfies the second predetermined condition; and after the adjustment of the position of the transmitting coil, re-acquiring the charging temperature indication information, re-performing the steps from detecting whether the charging temperature indication information satisfies the second predetermined condition until the charging efficiency indication information does not satisfy the first predetermined condition and the charging temperature indication information does not satisfy the second predetermined condition, and stopping adjusting the position of the transmitting coil.

In some embodiments, the acquiring the position offset indication information between the transmitting coil in the power transmitting device and the receiving coil in the power receiving device includes:

receiving a position adjustment parameter transmitted from the power receiving device, the position adjustment parameter being used to indicate an adjustment direction and an adjustment distance of the transmitting coil.

In some embodiments, the adjusting the position of the transmitting coil according to the position offset indication information includes:

determining the adjustment direction and the adjustment distance of the transmitting coil according to the position adjustment parameter; and adjusting the position of the transmitting coil according to the adjustment direction and the adjustment distance.

On the power receiving device side, in some embodiments, the determining, by the magnetic induction sensor, the position of the transmitting coil in the power transmitting device configured to charge the power receiving device includes:

acquiring a magnetic field parameter of a magnet arranged in the power transmitting device by the magnetic induction sensor, wherein a central position of the magnet is aligned with a central position of the transmitting coil; and determining the position of the transmitting coil according to the magnetic field parameter of the magnet.

In some embodiments, the determining the position of the transmitting coil according to the magnetic field parameter of the magnet includes:

determining a magnetic field component in a horizontal direction of the magnet according to the magnetic field parameter of the magnet, the magnetic field parameter of the magnet including a magnetic field direction and a magnetic field magnitude; and determining the position of the transmitting coil according to the magnetic field component and a first mapping relationship, the first mapping relationship being used to describe a mapping relationship between the magnetic field component and the position of the transmitting coil.

In some embodiments, the determining, by the magnetic induction sensor, the position of the transmitting coil in the power transmitting device configured to charge the power receiving device includes:

acquiring a magnetic field parameter of the transmitting coil by a magnetic induction sensor; and determining the position of the transmitting coil according to the magnetic field parameter of the transmitting coil.

In some embodiments, the acquiring the magnetic field parameter of the transmitting coil by the magnetic induction sensor includes:

collecting a magnetic field parameter of a first magnetic field of the transmitting coil by the magnetic induction sensor according to a first sampling frequency, the first magnetic field being a magnetic field generated by the transmitting coil for wireless charging; and determining the magnetic field parameter of the transmitting coil according to the magnetic field parameter of the first magnetic field acquired by sampling;

or collecting a magnetic field parameter of a second magnetic field of the transmitting coil by the magnetic induction sensor according to a second sampling frequency, the second magnetic field being another magnetic field generated by the transmitting coil in addition to the magnetic field for wireless charging; and determining the magnetic field parameter of the transmitting coil according to the magnetic field parameter of the second magnetic field acquired by sampling.

In some embodiments, the determining the position of the transmitting coil according to the magnetic field parameter of the transmitting coil includes:

determining a magnetic field component in a horizontal direction of the transmitting coil according to the magnetic field parameter of the transmitting coil, the magnetic field parameter of the transmitting coil including a magnetic field direction and a magnetic field magnitude; and determining the position of the transmitting coil according to the magnetic field component and a second mapping relationship, the second mapping relationship being used to describe a mapping relationship between the magnetic field component and the position of the transmitting coil.

In another aspect, an apparatus for adjusting a coil position is provided, which can applied to a power transmitting device. The apparatus includes:

an information acquiring portion, configured to acquire position offset indication information between a transmitting coil in the power transmitting device and a receiving coil in a power receiving device; wherein the power transmitting device is configured to wirelessly charge the power receiving device, and the position offset indication information is used to reflect a position offset between the transmitting coil and the receiving coil; and a position adjusting portion, configured to adjust a position of the transmitting coil according to the position offset indication information.

In some embodiments, the position offset indication information includes charging efficiency indication information, and the charging efficiency indication information is used to indicate a charging efficiency of the wireless charging;

the position adjusting portion includes:

a condition detecting component, configured to detect whether the charging efficiency indication information satisfies a first predetermined condition;

a position adjusting component, configured to adjust the position of the transmitting coil if the charging efficiency indication information satisfies the first predetermined condition; and an information acquiring component, configured to, after the adjustment of the position of the transmitting coil, re-acquire the charging efficiency indication information, detect whether the charging efficiency indication information satisfies the first predetermined condition by the condition detecting component again until the charging efficiency indication information does not satisfy the first predetermined condition, and stop adjusting the position of the transmitting coil.

In some embodiments, the information acquiring portion is further configured to:

acquire a transmitted power of the power transmitting device and a received power of the power receiving device;

calculate a charging efficiency according to the transmitted power and the received power; and determine the charging efficiency indication information according to the charging efficiency.

In some embodiments, the position offset indication information further includes charging temperature indication information, and the charging temperature indication information being used to indicate a temperature of the power transmitting device; and the condition detecting component is further configured to detect whether the charging temperature indication information satisfies a second predetermined condition;

the position adjusting component is further configured to adjust the position of the transmitting coil if the charging temperature indication information satisfies the second predetermined condition; and the information acquiring component is further configured to, after the adjustment of the position of the transmitting coil, re-acquire the charging temperature indication information, re-detect whether the charging temperature indication information satisfies the second predetermined condition by the condition detecting component again until the charging efficiency indication information does not satisfy the first predetermined condition and the charging temperature indication information does not satisfy the second predetermined condition, and stop adjusting the position of the transmitting coil.

In some embodiments, the information acquiring portion is further configured to:

receive a position adjustment parameter transmitted from the power receiving device, the position adjustment parameter being used to indicate an adjustment direction and an adjustment distance of the transmitting coil.

In some embodiments, the position adjusting portion is further configured to:

determine the adjustment direction and the adjustment distance of the transmitting coil according to the position adjustment parameter; and adjust the position of the transmitting coil according to the adjustment direction and the adjustment distance.

In another aspect, an apparatus for adjusting a coil position is provided, which is applied to a power receiving device. The apparatus includes:

a position determining portion, configured to determine, by a magnetic induction sensor, a position of a transmitting coil in a power transmitting device configured to wirelessly charge the power receiving device;

a parameter determining portion, configured to determine a position adjustment parameter of the transmitting coil according to a position of a receiving coil in the power receiving device and the position of the transmitting coil, wherein the position adjustment parameter is used to indicate an adjustment direction and an adjustment distance of the transmitting coil; and a parameter transmitting portion, configured to transmit the position adjustment parameter to the power transmitting device.

In some embodiments, the position determining portion includes:

a parameter acquiring component, configured to acquire a magnetic field parameter of a magnet arranged in the power transmitting device by the magnetic induction sensor, wherein a central position of the magnet is aligned with a central position of the transmitting coil; and a position determining component, configured to determine the position of the transmitting coil according to the magnetic field parameter of the magnet.

In some embodiments, the position determining component is further configured to:

determine a magnetic field component in a horizontal direction of the magnet according to the magnetic field parameter of the magnet, the magnetic field parameter including a magnetic field direction and a magnetic field magnitude; and determine the position of the transmitting coil according to the magnetic field component and a first mapping relationship, the first mapping relationship being used to describe a mapping relationship between the magnetic field component and the position of the transmitting coil.

In some embodiments, the position determining portion includes:

a parameter acquiring component, configured to acquire a magnetic field parameter of the transmitting coil by a magnetic induction sensor; and a position determining component, configured to determine the position of the transmitting coil according to the magnetic field parameter of the transmitting coil.

In some embodiments, the parameter determining component is further configured to:

collect a magnetic field parameter of a first magnetic field of the transmitting coil by the magnetic induction sensor according to a first sampling frequency, the first magnetic field being a magnetic field generated by the transmitting coil for wireless charging; and determine the magnetic field parameter of the transmitting coil according to the magnetic field parameter of the first magnetic field acquired by sampling;

or collect a magnetic field parameter of a second magnetic field of the transmitting coil by the magnetic induction sensor according to a second sampling frequency, the second magnetic field being another magnetic field generated by the transmitting coil in addition to the magnetic field for wireless charging; and determine the magnetic field parameter of the transmitting coil according to the magnetic field parameter of the second magnetic field acquired by sampling.

In some embodiments, the position determining component is further configured to:

determine a magnetic field component in a horizontal direction of the transmitting coil according to the magnetic field parameter of the transmitting coil, the magnetic field parameter of the transmitting coil including a magnetic field direction and a magnetic field magnitude; and determine the position of the transmitting coil according to the magnetic field component and a second mapping relationship, the second mapping relationship being used to describe a mapping relationship between the magnetic field component and the position of the transmitting coil.

Various embodiments of the present disclosure can have one or more of the following advantages.

The coil position can be adjusted by the power transmitting device according to the position offset between the transmitting coil and the receiving coil. If the power receiving device is not properly placed on the power transmitting device, the position of the transmitting coil is automatically adjusted, such that a geometric center of the transmitting coil coincides with or approaches that of the receiving coil as far as possible. In this way, the charging efficiency of the power receiving device is improved.

While this specification contains many specific implementation details, these should not be construed as limitations on the scope of any claims, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination.

Moreover, although features can be described above as acting in certain combinations and even initially claimed as such, one or more features from a claimed combination can in some cases be excised from the combination, and the claimed combination can be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products.

As such, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing can be utilized.

The above description includes part of embodiments of the present disclosure, and not limits the present disclosure. Any modifications, equivalent substitutions, improvements, etc., within the spirit and principles of the present disclosure, are included in the scope of protection of the present disclosure.

It is apparent that those of ordinary skill in the art can make various modifications and variations to the embodiments of the disclosure without departing from the spirit and scope of the disclosure. Thus, it is intended that the present disclosure cover the modifications and the modifications.

Various embodiments in this specification have been described in a progressive manner, where descriptions of some embodiments focus on the differences from other embodiments, and same or similar parts among the different embodiments are sometimes described together in only one embodiment.

It should also be noted that in the present disclosure, relational terms such as first and second, etc., are only used to distinguish one entity or operation from another entity or operation, and do not necessarily require or imply these entities having such an order or sequence. It does not necessarily require or imply that any such actual relationship or order exists between these entities or operations.

Moreover, the terms "include," "including," or any other variations thereof are intended to cover a non-exclusive inclusion within a process, method, article, or apparatus that comprises a list of elements including not only those elements but also those that are not explicitly listed, or other elements that are inherent to such processes, methods, goods, or equipment.

In the case of no more limitation, the element defined by the sentence "includes a . . . " does not exclude the existence of another identical element in the process, the method, or the device including the element.

Specific examples are used herein to describe the principles and implementations of some embodiments. The description is only used to help convey understanding of the possible methods and concepts. Meanwhile, those of ordinary skill in the art can change the specific manners of implementation and application thereof without departing from the spirit of the disclosure. The contents of this specification therefore should not be construed as limiting the disclosure.

For example, in the description of the present disclosure, the terms "some embodiments," or "example," and the like may indicate a specific feature described in connection with the embodiment or example, a structure, a material or feature included in at least one embodiment or example. In the present disclosure, the schematic representation of the above terms is not necessarily directed to the same embodiment or example.

Moreover, the particular features, structures, materials, or characteristics described can be combined in a suitable manner in any one or more embodiments or examples. In addition, various embodiments or examples described in the specification, as well as features of various embodiments or examples, can be combined and reorganized.

In the descriptions, with respect to circuit(s), unit(s), device(s), component(s), etc., in some occurrences singular forms are used, and in some other occurrences plural forms are used in the descriptions of various embodiments. It should be noted; however, the single or plural forms are not limiting but rather are for illustrative purposes. Unless it is expressly stated that a single unit, device, or component etc. is employed, or it is expressly stated that a plurality of units, devices or components, etc. are employed, the circuit(s), unit(s), device(s), component(s), etc. can be singular, or plural.

Based on various embodiments of the present disclosure, the disclosed apparatuses, devices, and methods can be implemented in other manners. For example, the abovementioned devices can employ various methods of use or implementation as disclosed herein.

In the present disclosure, the terms "installed," "connected," "coupled," "fixed" and the like shall be understood broadly, and may be either a fixed connection or a detachable connection, or integrated, unless otherwise explicitly defined. These terms can refer to mechanical or electrical connections, or both. Such connections can be direct connections or indirect connections through an intermediate medium. These terms can also refer to the internal connections or the interactions between elements. The specific meanings of the above terms in the present disclosure can be understood by those of ordinary skill in the art on a case-by-case basis.

Dividing the device into different "regions," "units," "components" or "layers," etc. merely reflect various logical functions according to some embodiments, and actual implementations can have other divisions of "regions," "units," "components" or "layers," etc. realizing similar functions as described above, or without divisions. For example, multiple regions, units, or layers, etc. can be combined or can be integrated into another system. In addition, some features can be omitted, and some steps in the methods can be skipped.

Those of ordinary skill in the art will appreciate that the units, components, regions, or layers, etc. in the devices provided by various embodiments described above can be provided in the one or more devices described above. They can also be located in one or multiple devices that is (are) different from the example embodiments described above or illustrated in the accompanying drawings. For example, the units, regions, or layers, etc. in various embodiments described above can be integrated into one module or divided into several sub-modules.

The various device components, modules, units, blocks, or portions may have modular configurations, or are composed of discrete components, but nonetheless can be referred to as "modules" in general. In other words, the "components," "modules," "blocks," "portions," or "units" referred to herein may or may not be in modular forms.

Moreover, the terms "first" and "second" are used for descriptive purposes only and are not to be construed as indicating or implying a relative importance or implicitly indicating the number of technical features indicated. Thus, elements referred to as "first" and "second" may include one or more of the features either explicitly or implicitly. In the description of the present disclosure, "a plurality" indicates two or more unless specifically defined otherwise.

The order of the various embodiments described above are only for the purpose of illustration, and do not represent preference of embodiments.

Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to the disclosed aspects of the exemplary embodiments can be made in addition to those described above by a person of ordinary skill in the art having the benefit of the present disclosure without departing from the spirit and scope of the disclosure contemplated by this disclosure and as defined in the following claims. As such, the scope of this disclosure is to be accorded the broadest reasonable interpretation so as to encompass such modifications and equivalent structures.

The invention claimed is:

1. A method for adjusting a coil position, applied to a power transmitting device, the method comprising:
   acquiring position offset indication information between a transmitting coil in the power transmitting device and a receiving coil in a power receiving device; wherein the power transmitting device is configured to wirelessly charge the power receiving device, and the position offset indication information is used to reflect a position offset between the transmitting coil and the receiving coil; and
   adjusting a position of the transmitting coil according to the position offset indication information; and
   wherein the position offset indication information comprises charging efficiency indication information and charging temperature indication information, the charging efficiency indication information is used to indicate a charging efficiency of the wireless charging and the charging temperature indication information is used to indicate a temperature of the power transmitting device; and the adjusting the position of the transmitting coil according to the position offset indication information comprises:
   adjusting a position of the transmitting coil according to the charging efficiency indication information and the charging temperature indication information.

2. The method according to claim 1, wherein adjusting the position of the transmitting coil according to the position offset indication information comprises:
   detecting whether the charging efficiency indication information satisfies a first predetermined condition;
   adjusting the position of the transmitting coil if the charging efficiency indication information satisfies the first predetermined condition; and after the adjustment of the position of the transmitting coil, re-acquiring the charging efficiency indication information, re-performing the step of detecting whether the charging efficiency indication information satisfies the first predetermined condition until the charging efficiency indication information does not satisfy the first predetermined condition, and stopping adjusting the position of the transmitting coil.

3. The method according to claim 2, wherein the acquiring the position offset indication information between the transmitting coil in the power transmitting device and the receiving coil in the power receiving device comprises:
acquiring a transmitted power of the power transmitting device and a received power of the power receiving device;
calculating a charging efficiency according to the transmitted power and the received power; and
determining the charging efficiency indication information according to the charging efficiency.

4. The method according to claim 2, wherein the method further comprises:
detecting whether the charging temperature indication information satisfies a second predetermined condition; and
adjusting the position of the transmitting coil if the charging temperature indication information satisfies the second predetermined condition; and after the adjustment of the position of the transmitting coil, re-acquiring the charging temperature indication information, re-performing the step of detecting whether the charging temperature indication information satisfies the second predetermined condition until the charging efficiency indication information does not satisfy the first predetermined condition and the charging temperature indication information does not satisfy the second predetermined condition, and stopping adjusting the position of the transmitting coil.

5. The method according to claim 1, wherein the acquiring the position offset indication information between the transmitting coil in the power transmitting device and the receiving coil in the power receiving device comprises:
receiving a position adjustment parameter transmitted from the power receiving device, wherein the position adjustment parameter is used to indicate an adjustment direction and an adjustment distance of the transmitting coil.

6. A method for adjusting a coil position, applied to a power receiving device and a power transmitting device, the method comprising:
determining, by a magnetic induction sensor, a position of a transmitting coil in the power transmitting device configured to wirelessly charge the power receiving device;
determining a position adjustment parameter of the transmitting coil according to a position of a receiving coil in the power receiving device and the position of the transmitting coil, wherein the position adjustment parameter comprises charging efficiency indication information and charging temperature indication information, the charging efficiency indication information is used to indicate a charging efficiency of the wireless charging and the charging temperature indication information is used to indicate a temperature of the power transmitting device; and the position adjustment parameter is used to indicate an adjustment direction and an adjustment distance of the transmitting coil;
transmitting the position adjustment parameter to the power transmitting device; and
adjusting a position of the transmitting coil according to the charging efficiency indication information and the charging temperature indication information.

7. The method according to claim 6, wherein the determining, by the magnetic induction sensor, the position of the transmitting coil in the power transmitting device configured to charge the power receiving device comprises:
acquiring a magnetic field parameter of a magnet arranged in the power transmitting device by the magnetic induction sensor, wherein a central position of the magnet is aligned with a central position of the transmitting coil; and
determining the position of the transmitting coil according to the magnetic field parameter of the magnet;
wherein the determining the position of the transmitting coil according to the magnetic field parameter of the magnet comprises:
determining a magnetic field component in a horizontal direction of the magnet according to the magnetic field parameter of the magnet, the magnetic field parameter of the magnet comprising a magnetic field direction and a magnetic field magnitude; and
determining the position of the transmitting coil according to the magnetic field component and a first mapping relationship, wherein the first mapping relationship is used to describe a mapping relationship between the magnetic field component and the position of the transmitting coil.

8. The method according to claim 6, wherein determining, by the magnetic induction sensor, the position of the transmitting coil in the power transmitting device configured to charge the power receiving device comprises:
acquiring a magnetic field parameter of the transmitting coil by a magnetic induction sensor; and
determining the position of the transmitting coil according to the magnetic field parameter of the transmitting coil.

9. The method according to claim 8, wherein the acquiring the magnetic field parameter of the transmitting coil by the magnetic induction sensor comprises:
collecting a magnetic field parameter of a first magnetic field of the transmitting coil by the magnetic induction sensor according to a first sampling frequency, the first magnetic field being a magnetic field generated by the transmitting coil for wireless charging; and determining the magnetic field parameter of the transmitting coil according to the magnetic field parameter of the first magnetic field acquired by sampling;
or
collecting a magnetic field parameter of a second magnetic field of the transmitting coil by the magnetic induction sensor according to a second sampling frequency, the second magnetic field being another magnetic field generated by the transmitting coil in addition to the magnetic field for wireless charging; and determining the magnetic field parameter of the transmitting coil according to the magnetic field parameter of the second magnetic field acquired by sampling.

10. The method according to claim 8, wherein the determining the position of the transmitting coil according to the magnetic field parameter of the transmitting coil comprises:
determining a magnetic field component in a horizontal direction of the transmitting coil according to the magnetic field parameter of the transmitting coil, the magnetic field parameter of the transmitting coil comprising a magnetic field direction and a magnetic field magnitude; and determining the position of the transmitting coil according to the magnetic field component and a second mapping relationship, the second mapping relationship being used to describe a mapping relationship between the magnetic field component and the position of the transmitting coil.

11. An apparatus implementing a method for adjusting a coil position, the apparatus comprising:

a processor; and memory storing at least one instruction executable by the processor; and wherein the processor is configured to perform;

acquiring position offset indication information between a transmitting coil in the power transmitting device and a receiving coil in a power receiving device; wherein the power transmitting device is configured to wirelessly charge the power receiving device, and the position offset indication information is used to reflect a position offset between the transmitting coil and the receiving coil; and adjusting a position of the transmitting coil according to the position offset indication information; and wherein the position offset indication information comprises charging efficiency indication information and charging temperature indication information, the charging efficiency indication information is used to indicate a charging efficiency of the wireless charging and the charging temperature indication information is used to indicate a temperature of the power transmitting device; and the adjusting the position of the transmitting coil according to the position offset indication information comprises:

adjusting a position of the transmitting coil according to the charging efficiency indication information and the charging temperature indication information.

12. The apparatus according to claim 11, wherein the processor is further configured to:

detect whether the charging efficiency indication information satisfies a first predetermined condition;

adjust the position of the transmitting coil if the charging efficiency indication information satisfies the first predetermined condition; and after the adjustment of the position of the transmitting coil, re-acquire the charging efficiency indication information, detect whether the charging efficiency indication information satisfies the first predetermined condition by the condition detecting component again until the charging efficiency indication information does not satisfy the first predetermined condition, and stop adjusting the position of the transmitting coil.

13. The apparatus according to claim 12, wherein the processor is further configured to:

acquire a transmitted power of the power transmitting device and a received power of the power receiving device;

calculate a charging efficiency according to the transmitted power and the received power; and determine the charging efficiency indication information according to the charging efficiency.

14. The apparatus according to claim 12, wherein the processor is further configured to:

detect whether the charging temperature indication information satisfies a second predetermined condition;

adjust the position of the transmitting coil if the charging temperature indication information satisfies the second predetermined condition; and after the adjustment of the position of the transmitting coil, re-acquire the charging temperature indication information, detect whether the charging temperature indication information satisfies the second predetermined condition by the condition detecting component again until the charging efficiency indication information does not satisfy the first predetermined condition and the charging temperature indication information does not satisfy the second predetermined condition, and stop adjusting the position of the transmitting coil.

15. The apparatus according to claim 11, wherein the processor is further configured to receive a position adjustment parameter transmitted from the power receiving device, and wherein the position adjustment parameter is used to indicate an adjustment direction and an adjustment distance of the transmitting coil.

16. An apparatus implementing a method for adjusting a coil position and a power transmitting device, the apparatus comprising:

a processor; and memory storing at least one instruction executable by the processor; and wherein the processor is configured to perform:

determining, by a magnetic induction sensor, a position of a transmitting coil in the power transmitting device configured to wirelessly charge the power receiving device;

determining a position adjustment parameter of the transmitting coil according to a position of a receiving coil in the power receiving device and the position of the transmitting coil, wherein the position adjustment parameter comprises charging efficiency indication information and charging temperature indication information, the charging efficiency indication information is used to indicate a charging efficiency of the wireless charging and the charging temperature indication information is used to indicate a temperature of the power transmitting device; and the position adjustment parameter is used to indicate an adjustment direction and an adjustment distance of the transmitting coil;

transmitting the position adjustment parameter to the power transmitting device; and adjusting a position of the transmitting coil according to the charging efficiency indication information and the charging temperature indication information.

17. The apparatus according to claim 16, wherein the processor is further configured to:

acquire a magnetic field parameter of a magnet arranged in the power transmitting device by the magnetic induction sensor, wherein a central position of the magnet is aligned with a central position of the transmitting coil;

determine the position of the transmitting coil according to the magnetic field parameter of the magnet;

determine a magnetic field component in a horizontal direction of the magnet according to the magnetic field parameter of the magnet, the magnetic field parameter comprising a magnetic field direction and a magnetic field magnitude; and determine the position of the transmitting coil according to the magnetic field component and a first mapping relationship, the first mapping relationship being used to describe a mapping relationship between the magnetic field component and the position of the transmitting coil.

18. The apparatus according to claim 16, wherein the processor is further configured to:
acquire a magnetic field parameter of the transmitting coil by a magnetic induction sensor;
determine the position of the transmitting coil according to the magnetic field parameter of the transmitting coil; and
collect a magnetic field parameter of a first magnetic field of the transmitting coil by the magnetic induction sensor according to a first sampling frequency, the first magnetic field being a magnetic field generated by the transmitting coil for wireless charging; and determine the magnetic field parameter of the transmitting coil according to the magnetic field parameter of the first magnetic field acquired by sampling;
or
collect a magnetic field parameter of a second magnetic field of the transmitting coil by the magnetic induction sensor according to a second sampling frequency, the second magnetic field being another magnetic field generated by the transmitting coil in addition to the magnetic field for wireless charging; and determine the magnetic field parameter of the transmitting coil according to the magnetic field parameter of the second magnetic field acquired by sampling.

19. The apparatus according to claim 16, wherein the processor is further configured to:
determine a magnetic field component in a horizontal direction of the transmitting coil according to the magnetic field parameter of the transmitting coil, the magnetic field parameter of the transmitting coil comprising a magnetic field direction and a magnetic field magnitude; and
determine the position of the transmitting coil according to the magnetic field component and a second mapping relationship, the second mapping relationship being used to describe a mapping relationship between the magnetic field component and the position of the transmitting coil.

* * * * *